United States Patent [19]

Surbrook

[11] Patent Number: 4,924,301

[45] Date of Patent: May 8, 1990

[54] APPARATUS AND METHODS FOR DIGITAL HALFTONING

[75] Inventor: Craig L. Surbrook, Bellevue, Wash.

[73] Assignee: SeeColor Corporation, Bellevue, Wash.

[21] Appl. No.: 268,951

[22] Filed: Nov. 8, 1988

[51] Int. Cl.$^5$ ............................................. H04N 1/40
[52] U.S. Cl. ..................................... 358/75; 358/454; 358/456
[58] Field of Search ................. 358/75, 429, 454, 456, 358/457, 458, 459

[56] References Cited

U.S. PATENT DOCUMENTS

| | | | |
|---|---|---|---|
| 3,911,480 | 10/1975 | Brucker | 358/75 |
| 4,556,918 | 12/1985 | Yamazaki | 358/283 |
| 4,644,392 | 2/1987 | Yamada | 358/456 |
| 4,680,625 | 7/1987 | Shoji | 358/75 |
| 4,700,235 | 10/1987 | Gall | 358/459 |
| 4,783,837 | 11/1988 | Kawamura | 358/283 |
| 4,809,603 | 2/1989 | Moriguchi | 358/75 |

OTHER PUBLICATIONS

"Basic Digital Imagining Concepts," *Advertising Supplement to Macweek,* Aug. 1988, pp. 18-19.
James D. Foley and Andries Van Dam, "Geometrical Transformations," Raster Algorithms and Software, Intensity and Color, *Fundamentals of Interactive Computer Graphics,* Addison-Wesley Publishing Company: Menlo Park, Calif., 1982.
Halftone, "Halftone Contact Screen," gray scale, dither, dither matrix, *McGraw-Hill Dictionary of Scientific and Technical Terms,* 2nd Ed., McGraw Hill Book Company, 1978.

*Primary Examiner*—James J. Groody
*Assistant Examiner*—Grant, II: Jerome
*Attorney, Agent, or Firm*—Christensen, O'Connor, Johnson & Kindness

[57] ABSTRACT

Disclosed are apparatus and methods for producing halftone screens (color separations) from continuous tone intensity signals that are supplied by an optical scanner (12). A digital signal processor (10) processes the continuous tone intensity values to establish memory maps (18-6, 18-7, 18-8 and 18-10) which, in conjunction with a digital data output device (34) (e.g., a laser printer or a conventional image setter), produce the desired halftone screens. In producing halftone screens having a screen angle that does not substantially differ from 90° (e.g., the 90°, 105°, and 75° screen angles of the yellow, cyan and magenta color separations in conventional four color halftone printing), the digital signal processor (10) utilizes a dither matrix (FIG. 4) that is arranged to produce each halftone dot of the corresponding halftone screen at the desired screen ruling. In producing halftone screens having a screen angle that substantially differs from 90° (e.g., the 45° screen angle used in the black halftone color separation in conventional four color halftone printing), the digital signal processor (10) utilizes a dither array that properly positions the halftone dots of the resulting halftone screen and, in addition, establishes the desired screen ruling.

22 Claims, 12 Drawing Sheets

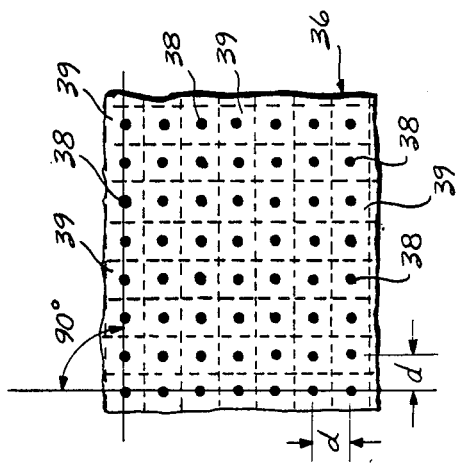
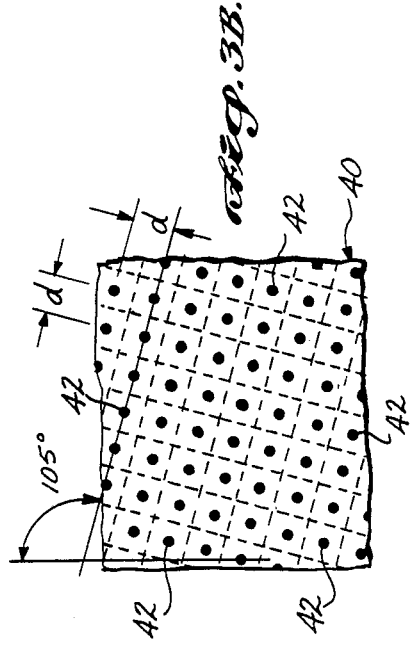
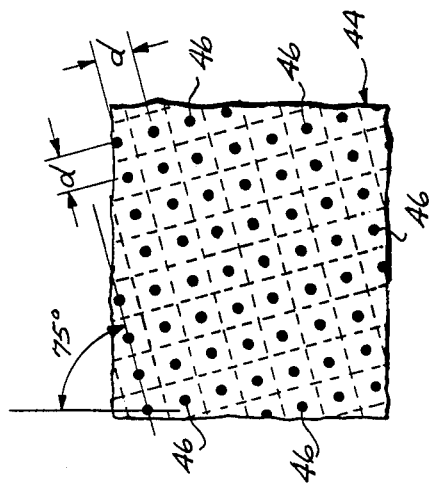
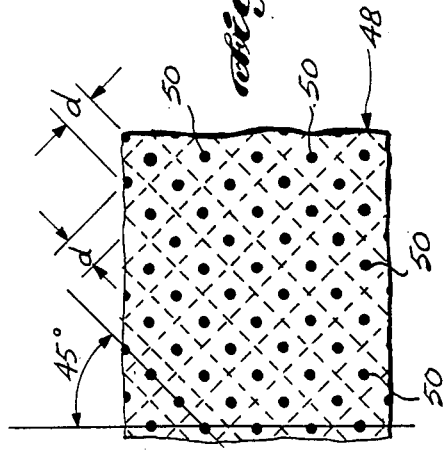

|    |    |    |    |    |    |    |    |
|----|----|----|----|----|----|----|----|
| 62 | 55 | 47 | 40 | 36 | 51 | 59 | 63 |
| 58 | 35 | 28 | 20 | 16 | 24 | 32 | 52 |
| 50 | 27 | 15 | 8  | 4  | 12 | 29 | 48 |
| 43 | 19 | 7  | 0  | 1  | 9  | 21 | 41 |
| 39 | 23 | 11 | 3  | 2  | 5  | 17 | 37 |
| 46 | 31 | 14 | 6  | 10 | 13 | 25 | 44 |
| 54 | 34 | 26 | 18 | 22 | 30 | 33 | 56 |
| 61 | 57 | 49 | 42 | 38 | 45 | 53 | 60 |
*Fig. 4.*
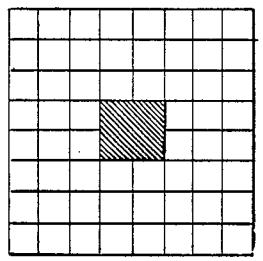
*Fig. 5A.*
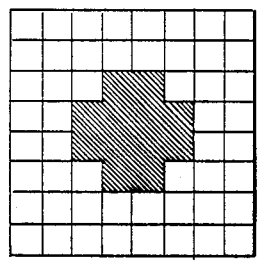
*Fig. 5B.*
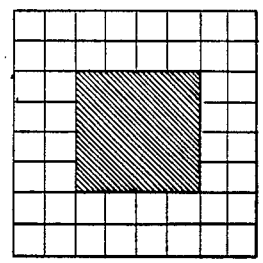
*Fig. 5C.*
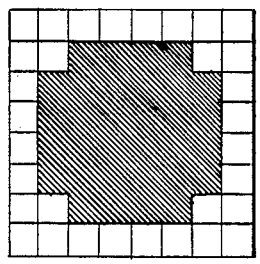
*Fig. 5D.*
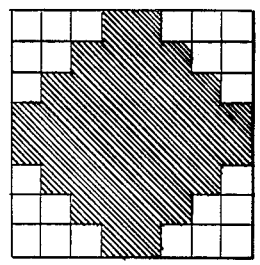
*Fig. 5E.*
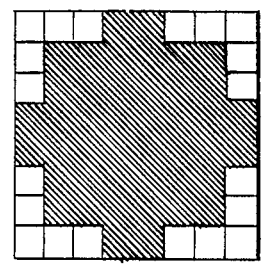
*Fig. 5F.*

APPARATUS AND METHODS FOR DIGITAL HALFTONING

FIELD OF THE INVENTION

This invention relates to apparatus and methods for halftone printing processes. More specifically, this invention relates to digital halftone systems in which processing of continuous tone image information representative of the cyan, yellow, magenta and black content of an image being reproduced is generated and processed to produce halftone screens for use in a four color printing process.

BACKGROUND OF THE INVENTION

Printing of photographs and other images in newspapers, magazines, books and other hardcopy material generally uses a process known as halftoning. In halftone printing of continuous tone black and white images, paper or other reflective hardcopy material is imprinted with a large number of circles or dots of black ink with the area of each dot being proportional to the blackness (i.e., 1-intensity) of a corresponding incremental area of the original photograph or image. Each halftone dot appears at a position that is equidistant from each adjacent potential halftone dot position so that each halftone dot occupies a single resolution cell or element within a rectangular array or grid. Traditionally, the printing plates for halftone printing were prepared by photographing the image to be reproduced through a screen having the desired interstitial spacing or cell size. This process, known as screening, results in a photographic negative (a "halftone screen") which can be utilized in conventional processes for producing printing plates with the halftone screen exhibiting the desired dot size-image intensity relationship and regularity of spacing between dots.

When an image that has been printed by halftoning is viewed from a distance, the eye performs spatial integration so that various regions of the image are perceived as being black, white, or as being of intermediate intensity (i.e., a shade of grey). Thus, it can be recognized that the degree to which halftone printing is perceived as being identical to the original black and white image largely depends upon the halftone dot frequency that is employed, which commonly is referred to as the line frequency or screen ruling. Another important factor is the ability of the printing press to imprint the type of paper or other hardcopy material being employed with halftone dots that correspond in area with the dots of the halftone screen. For example, because of the type of paper employed and the printing presses used, newspaper halftones typically are printed at a line frequency of 60 to 100 lines per inch, while magazine and book halftones typically are printed at a line frequency on the order of 133–150 lines per inch.

Halftoning also has been used for a number of years in reproducing color images on paper or other reflective hardcopy material. Specifically, color halftoning utilizes separate printing plates (and hence separate halftone screens) for three primary colors (cyan, magenta and yellow) and for the color black. As is known in the art, the three primary colors, cyan, magenta and yellow are called the subtractive primary colors because white light that is reflected from each of these colors has subtracted from it one of the additive primary colors (red, green and blue). More specifically, when a reflective hardcopy surface is coated with cyan ink or pigment, reflected white light (itself the sum of red, green and blue) includes only the colors green and blue. Similarly, magenta absorbs or subtracts the color green from impinging white light and yellow absorbs or subtracts the color blue. Thus, for example, if color halftone printing techniques are utilized to first imprint paper or another reflective hardcopy material with a closely packed array of cyan dots and then imprint each interstitial region between the cyan dots with magenta dots, impinging white light that is reflected from the material will largely be devoid of both the colors red and blue. Thus, the spatial integration that occurs when the composite reproduction is viewed from a distance results in the perception of the color green with parameters such as the amount of reflective material that is not imprinted, the reflectivity of that material, and both the reflectivity and the purity of the inks or pigments used determining qualities such as the brightness, shade and intensity of the perceived color. Although combining cyan, magenta and yellow theoretically results in the absorption of all three additive primaries (and hence the color black), modern color halftoning includes a black halftone because slight impurities in commercially available cyan, magenta and yellow printing inks, do not allow production of deep black (high densities) with a cyan, magenta and yellow halftoning process. Further, grey shades do not appear of proper shade when only cyan, magenta and yellow halftone dots are used. Thus, without the use of a black halftone, the printing process would not result in faithful reproduction of black objects and the brightness or the intensity of some of the colors appearing in the reproduction often would differ from that of the image being reproduced.

Each of the four halftone screens that is utilized in the four color halftone process is subject to the constraints and considerations mentioned relative to halftone processing of black and white images, including regularity of halftone screen line spacing (i.e., little or no variation in screen ruling) and control of the halftone dot size to adequately reflect the intensity or brightness of the associated color within incremental regions of the image being reproduced. In addition, in color halftoning, the screen angles (i.e., the angle at which the lines of spaced-apart halftone dots intersect the vertical axis of the image being reproduced) must be different for each of the halftones and must be carefully controlled. Specifically, when an image is reproduced by the color halftone process, optical interference occurs between the intersecting lines of halftone dots that are associated with each of the four color halftone screens. Depending upon the particular screen angles employed, these interference patterns (known as moiré) can be extremely discernable. In this regard and as is well known in the art of color halftone printing, a subdued and rather pleasing interference pattern that is known as a rosette results when the screen angles for the cyan, magenta and black color separations are offset from one another by 30°. Since the screen angle for the black halftone color separation customarily is 45°, a convention has been adopted in which the screen angles for the magenta halftone color separation and the cyan halftone color separation are 75° and 105°, respectively. In this convention, the screen angle for the yellow halftone separation is established at 90°.

Photographically producing satisfactory halftone screens (also known as color separations) for use in a four color halftone process utilizes techniques similar to the photographic techniques utilized in producing an achromatic screen for black and white halftone reproduction. Specifically, each color separation is obtained by photographing the image to be reproduced through an appropriate color filter and a screen that is oriented to provide the desired screen angle.

Advances in the fields of digital electronics and optical scanning have led to numerous attempts to develop digital imaging systems for four color halftone processing. Basically, in digital signal processing systems for producing halftone color separations, the image to be reproduced is scanned with an optical scanner to generate digitized signals representative of the color contained in small incremental regions ("pixels") of the image being processed. The digitized color representative signals are then processed to generate digitally encoded signals that are representative of the cyan, yellow, magenta and black components for each of the image pixels. Further processing of the digitally encoded signals is performed to establish a set or array of digitally encoded signals that establish the position, size and shape of the halftone dots that are produced when the data is coupled to a conventional digital output device such as a laser printer or a similar digital output device (e.g., a conventional device that is known as a laser image setter).

Although some previously proposed digital four color halftone processing systems utilize signal processing that allow conventional digital output devices to generate color separations that reasonably approximate color separations obtained by traditional photographic methods, such separations have only been produced by systems that utilize high resolution digital output devices and a substantial amount of digital signal processing. Because of the resulting expense and complexity, commercial application of the previously proposed systems generally has been limited to high volume printing and publishing applications in which the convenience and reliability of a digital four color halftone processing system over the traditional photographic system can be justified. Thus, a need exists for improved four color digital halftoning methods and apparatus that produce screen separations having halftone dots that are formed by a digital output device in a manner that results in satisfactory line separation, screen angle and relationship between halftone dot size and continuous tone intensity.

SUMMARY OF THE INVENTION

In the practice of this invention, digitally encoded signals that are supplied by a scanning unit and are representative of the color content within small incremental regions (i.e., pixels) of the image being reproduced are processed to obtain digitally encoded signals (continuous tone intensity signals) for each halftone screen or color separation that is to be produced by the invention. The digitally encoded continuous tone signals for each color of interest are stored in memory as an ordered array in which the signals can be accessed in accordance with row and column location in a Cartesian coordinate system that is referenced to the halftone screen to be produced (and, hence, referenced to the photographic image being reproduced).

Dither techniques are employed to process the digitally encoded continuous tone intensity signals to provide a memory map that corresponds to the halftone screen being produced with each bit location of the memory map corresponding to an associated resolution unit of the digital output device that produces the halftone screen (e.g., laser printer or laser image setter). Thus, the memory map determines the incremental regions (resolution units) of a hardcopy print that will be inked by a laser printer or, in the alternative, will be developed in a photographic negative that is produced by a digital image setter (e.g., a laser image setter or a light emitting diode (LED) image setter).

In accordance with the invention, the dither technique that is employed in processing the digitally encoded continuous tone intensity signals depends upon the screen angle of the halftone screen being produced. In the regard, a dither matrix is utilized when the screen angle is 90° (such as the yellow color separation in conventional halftone color printing) and, is used with some modification in the signal processing, when the screen angle does not deviate substantially from 90° (e.g., the 105° and 75° screen angles for cyan and magenta color separations in conventional halftone color printing). A dither array that is specifically established in accordance with the desired screen angle is employed for screen angles that substantially differ from 90° (e.g., the 45° screen angle employed in black and white halftone printing and as the screen angle for the black color separation in conventional halftone color printing). Utilization of different dither techniques that depend upon the screen angle results in halftone screens that in essence replicate the halftone printing capabilities of conventional photographic halftone techniques with fewer halftone dots than has heretofor been possible with digital halftone systems. Thus, satisfactory results can be obtained with commercially available digital output devices that have an output resolution on the order of 300 resolution units per inch.

The dither technique that is employed in producing yellow, magenta and cyan halftone color separations (and any other halftone screen in which the screen angle is not substantially different from 90°) employs a n×n dither matrix in which each element of the dither matrix corresponds to a bit location in the memory map that represents the halftone screen being produced and, in addition, each element of the dither matrix is a dither threshold value. In processing continuous tone intensity signals with the n×n dither matrix, each stored digitally encoded continuous tone intensity signal is compared to an associated dither threshold value of the dither matrix and, if the continuous tone intensity value exceeds the corresponding dither matrix threshold value, a corresponding bit of the memory map for the halftone screen being produced is set (e.g., made equal to a binary 1). More specifically, in the practice of the invention, in the conceptual sense, the dither matrix is positioned over a portion of the ordered memory array of continuous tone intensity values and a corresponding region of the memory map for the halftone screen being produced is established so that memory map bit locations are set in a manner that will produce one halftone dot of the halftone screen. To insure that the dither process produces a cluster of inked areas (or developed areas in a photographic negative output), the threshold values of the dither matrix are arranged to produce a growth sequence in which increasing levels of continuous tone intensity values cause an increase in the number of memory bits that are set with the set bits occupying contiguous regions in the memory map.

The processing of the stored continuous tone intensity signals proceeds on a row-by-row basis, with the continuous tone intensity values contained in each row being processed in a one-by-one sequence prior to processing the next row of stored signals. To in effect establish a dither array in which the dither matrix is repeated over the full row and column dimensions of the memory space that stores the continuous tone intensity values, modulo n signal processing is utilized.

In processing continuous tone intensity signals in which the screen angle of the halftone screen being produced is 90°, the above-discussed dither technique results in a halftone screen having a screen angle of 90° and a screen ruling of r/d where r is equal to the number of resolution units per unit length of the digital output device being employed. To obtain the same screen ruling and an screen angle other than 90° (e.g., the 105° and 75° screen angles for cyan and magenta conventional halftone color separations), the signal processing of the invention maps the continuous tone signals from "continuous tone space" into "dither space" in which the dither matrix has been rotated to achieve the desired screen angle. In this transformation, the memory address of each continuous tone intensity value in effect is rotated in the Cartesian coordinate system that is associated with the stored continuous tone intensity signals (and the halftone screen being produced) to obtain a memory address in dither space. The continuous tone intensity value is then compased to the dither threshold value stored at that address and the memory that corresponds to the memory address of the continuous tone signal being processed is then set or not set in accordance with the comparison. This causes halftone dots to be produced at the desired screen angle and with the same growth sequence that is exhibited by the signal processing utilized for the 90° screen angle. Since the dither matrix used for each of the screen angles is $n \times n$, identical screen ruling is obtained.

In the currently preferred embodiments of the invention, the above-discussed signal processing for screen angles that do not substantially differ from 90°, incorporates several techniques which enhance system efficiency and reduce signal processing complexity. For example, the coordinate rotation utilized in transforming continuous tone intensity signal addresses from continuous tone space to dither space utilizes homogeneous coordinates in which each memory address is a three-element row vector and the transformation is represented by a $3 \times 3$ transformation matrix. This allows signal processing that effects matrix multiplication and is easily implemented in either programmed digital signal processors or by conventional, commercially available circuits. In addition, to obtain greater processing speed and efficiency, the currently preferred embodiments of the invention utilize incremental signal processing which reduces the signal processing required to transform the memory addresses of the stored continuous tone signals into dither space. In this incremental processing technique, it is only necessary to utilize the signal processing that rotates a continuous tone intensity memory address for the first element of each row of each stored continuous tone intensity signals. The transformed memory address for each subsequent continuous tone intensity value within that row is then determined by incrementing the row and column addresses by a predetermined amount. A third signal processing technique that is employed in the currently preferred embodiment of the invention to provide greater speed and efficiency is the elimination of the need to perform floating point operations during the signal processing. This is achieved by what sometimes is called "left shift" (multiplication) of each transformed memory address and by a corresponding "right shift" (division) at an appropriate stage of the signal processing.

In processing stored continuous tone signals for halftone screens that have a screen angle that is substantially different than 90° (e.g., the 45° screen angle used for black and white halftones and the black color separation in conventional halftone color printing), a specifically organized $m \times m$ dither array is utilized that includes halftone dither cells that are positioned to provide the desired screen angle. In this dither array, each halftone dither cell includes a number of threshold values that is less than the number of continuous tone intensity values for the halftone screen being produced. For example, in the disclosed embodiment of the invention, the continuous tone intensity values are consecutive integers that range between 1 and 64. In this arrangement, each halftone dither cell includes thirty-two dither threshold values, with the threshold values being organized as elements of the halftone dither cells in a manner that establishes a growth sequence that forms a halftone dot as a cluster of inked areas in a laser printed halftone screen or cluster of exposed areas in a photographic negative halftone screen. As was the case with the signal processing that was used in accordance with the invention for screen angles that are not substantially different than 90°, the area of the halftone dot that is produced is representative of the continuous tone intensity signals. That is, for each level of continuous tone intensity value, a halftone screen of uniform grey scale will be produced.

It should be noted that, although the currently preferred embodiments of the invention utilize halftone dither cells that include dither threshold values for one half the range of continuous tone values, the invention is not limited to that particular arrangement. More specifically, the signal processing technique employed in the practice of the invention in effect divides the range of continuous tone intensity values into a lower range and an upper range, with the $m \times m$ halftone dither cells including one threshold value for each of the continuous tone values that are in the lower range. A second constraint is that the $m \times m$ dither array includes halftone dither cells (and, in some case, portions of halftone dither cells) that are positioned both to provide the desired screen ruling and to form a repeating pattern of halftone cells when modulo m signal processing is utilized, both with respect to the processing of continuous tone intensity values within a row of stored continuous tone intensity values and with respect to processing the stored continuous tone values on a row-by-row basis. In addition, the dither threshold value for each element that is not within one of the halftone dither cells of the $m \times m$ dither array (or a portion of a halftone dither cell) is set at a value that is outside the range of continuous tone values for the continuous tone intensity signals being processed. In the signal processing that is utilized with the dither array, the memory map bit locations that are associated with threshold values that are outside the range of continuous tone values cannot be set and, thus, regions of the resulting halftone screen will always be white in a laser printed halftone screen (developed in a photographic negative screen) regardless of the value of the associated continuous tone intensity signals. Thus, it can be recognized that the $m \times m$ dither array, as arranged for the lower range of continuous tone values, provides a set of grey scale levels that includes white (grey scale of zero) and a consecutive set of grey scale levels 0, 1, ..., k, where k is equal to the number of threshold values (dither elements) that is included in the halftone dither cells. For example, in the currently preferred embodiments that utilize thirty-two threshold values in each halftone dither cell, the m×m dither array provides thirty-three grey scale levels (white and grey scale levels 1–32, inclusive).

In the practice of the invention, grey scale levels for the upper range of continuous tone intensity values (e.g., continuous tone intensity levels 33–64, in the disclosed embodiment of the invention) are provided by using a m×m dither array in which elements that correspond to the halftone dither cells for the lower range of continuous tone intensity values are assigned threshold values that result in setting of the corresponding bit location of the halftone memory map for any continuous tone value that is within the upper range of continuous tone values. Thus, the corresponding regions of the halftone screen will be inked or developed in the halftone screen for any continuous tone value that is within the upper range of continuous tone values. In addition, dither elements of the m×m dither array that correspond to elements that are outside the halftone dither cells in the array that is utilized with the lower range of continuous tone values are assigned dither threshold values that will result in setting the corresponding bit locations in the halftone memory map. Like the dither threshold values of the halftone cells for the lower range of continuous tone intensity values, the organization of dither threshold values in the array for the upper range of continuous tone intensity values establishes controlled growth sequence that results in uniform grey scale halftone screens for increasing continuous tone intensity values that are within the upper range of intensity values.

The overall result is that increasing uniform continuous tone intensity values within the lower range of intensity values in growth of halftone dots that reach a specific size (area) and shape. When the limit of the lower range is reached, increasing uniform continuous tone values (which now are in the upper range) result in halftone dots of a different shape. Specifically, white (or developed) regions that separated the maximum size halftone dots in the halftone color separation for the lower range are now inked (undeveloped) and become the minimum size halftone dot for color separations in the upper range and additional output resolution units of the halftone screen are inked (undeveloped) in accordance with the increase in continuous tone intensity value so as to increase the size of the halftone dots (which thus exhibits a higher grey scale level).

Although the above-discussed operation can be achieved by utilizing two separate m×m dither arrays of the type described, the currently preferred embodiment of the invention requires only a single m×m dither array in conjunction with signal processing that eliminates the need for a second m×m dither array. More specifically, in the currently preferred embodiments of the invention, a 34×34 dither array is utilized with each halftone dither cell including an ordered sequence of dither threshold values ranging between 0 and 31. All dither elements located outside the halftone dither cells are assigned a value of 99. The geometry of the 34×34 dither array is such that shifting (incrementing) the location of each dither element by 17 in effect establishes the pattern desired for processing continuous tone intensity values within the range of 33–64 (the upper range of the disclosed embodiment of the invention). To achieve the above-discussed result that dither threshold elements that are outside the halftone continuous cells of the array that is used with the lower range of continuous values, the signal processing criteria for setting the associated bits of the memory map that represents the halftone screen produced are in effect reversed. Specifically, in processing continuous tone intensity values within the lower range (1–32), each continuous tone intensity value that is processed is compared to an associated dither threshold of the dither array (using modulo 34 operation). The corresponding bit location of the memory map is set (e.g., made equal to binary 1) if the continuous tone value exceeds the associated dither threshold value. On the other hand, in processing continuous tone intensity values in the upper range (33–64), the corresponding bit of the memory map is set if the continuous tone intensity value is either less than or equal to the dither threshold value. Since the threshold values that are outside the halftone dither cells of the 34×34 dither array are set at a value that exceeds the value of the maximum continuous tone intensity value (are set at 99 in the currently preferred embodiment of the invention), corresponding bit locations will not be set for any continuous tone value within the lower range of continuous tone values (1–32). However, the corresponding bit locations of the memory map will be set for continuous tone intensity values within the upper range (33–64).

The signal processing of the disclosed embodiment of the invention also eliminates the need to assign threshold values to regions of the dither array that are outside the halftone dither cells. Specifically, in the signal processing of the disclosed embodiment, each continuous tone intensity value within the range 33–64 is subtracted from 64 prior to performing the comparison with the associated dither threshold value. As was previously mentioned, the comparison for continuous tone intensity values that are within the range 33–64 consists of setting the corresponding bit location of the halftone memory map when the continuous tone intensity value is less than or equal to the dither threshold value. Modifying the continuous tone intensity value by subtracting it from 64 can be shown to be equivalent to establishing dither threshold values for the upper range of continuous tone intensity values as was discussed relative to using a separate m×m dither array for continuous tone values that are within the upper range.

BRIEF DESCRIPTION OF THE DRAWING

These and other aspects and advantages of the invention can be ascertained in view of the following description and the referenced drawing in which:

FIGS. 3A–3D, respectively, illustrate portions of a yellow, cyan, magenta and black color separation or halftone screen of the type conventionally employed in four color halftone processing;

FIG. 4 depicts an 8×8 dither matrix that is utilized in the currently preferred embodiments of the invention relative to producing yellow, cyan and magenta halftone color separations;

FIGS. 5A–5F indicate the halftone dot configurations that result from use of the dither matrix of FIG. 4 for six different continuous tone intensity levels;

FIGS. 10A and 10B more specifically depict the dither array of FIG. 8, specifically illustrating the dither threshold values used in forming the halftone dots of the black halftone color separation;

DETAILED DESCRIPTION

Figure 1:
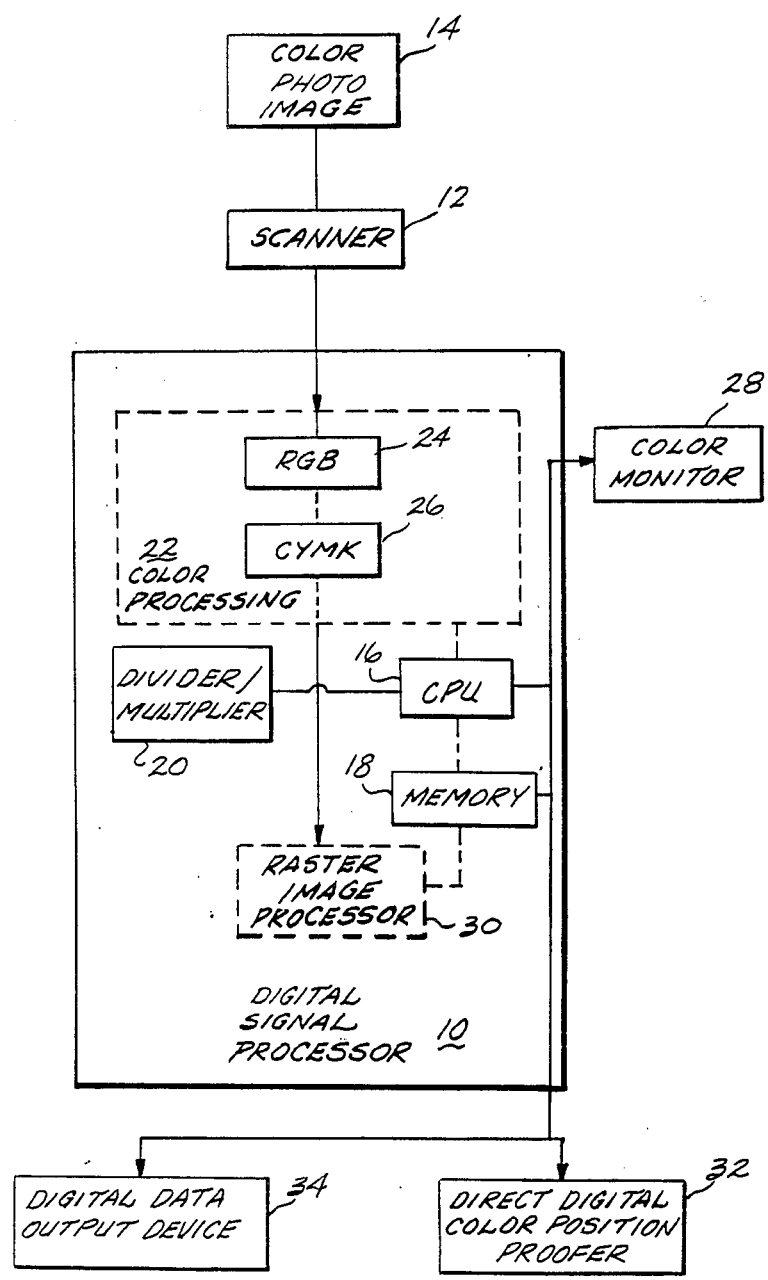
FIG. 1 is a block diagram of a four color halftone processing system of the type in which the invention can be practiced.
Figure 2:
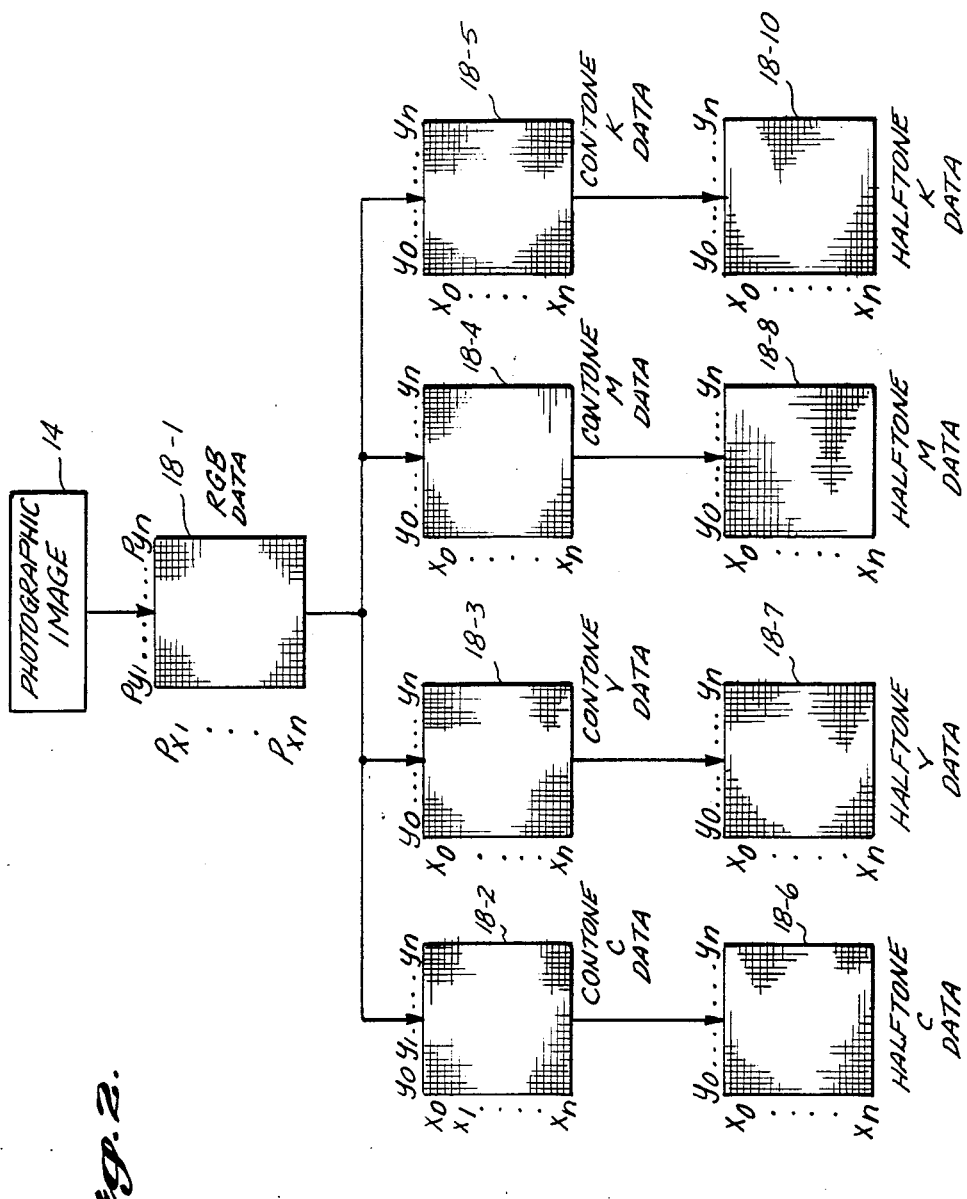
FIG. 2 schematically depicts the processing and storage of digital signals in the system of FIG. 1.

The basic structural and functional aspects of the invention can be understood with reference to FIGS. 1-3. Referring first to FIG. 1, the invention currently is embodied in a four color halftone processing system which includes a digital signal processor 10, which performs signal processing in accordance with the invention to produce halftone hardcopies (e.g., on paper or photographic film) from which the four printing plates required in four color halftone printing can be generated. As is indicated in FIG. 1, a scanner unit 12 supplies digitally encoded signals to digital signal processor 10 that are representative of the color content of small incremental regions (pixels) of a photographic color image 14.

As also is indicated in FIG. 1, digital signal processor 10 includes a central processing unit (CPU) 16 and memory unit 18, which collectively function to process digitally encoded signals in accordance with the invention and provide the output signals that are discussed in the following paragraphs. Although not necessary in the practice of the invention, the currently preferred embodiments include a hardware divider/multiplier circuit 20. As will be recognized by those of ordinary skill in the art, inclusion of a hardware divider/multiplier circuit 20 can enhance the computational speed of digital signal processor 10, hence reducing the signal processing time required to generate the four separate halftones that are provided by the invention for each photographic color image 14 that is processed. On the other hand, the signal processing effected by such a divider/multiplier can be performed by CPU 16, or alternatively by other known circuit arrangements.

In the practice of the invention, scanner unit 12 can be a commercially available optical scanner, with the particular device employed being selected primarily on the basis of the type of photographic color image 14 that is to be processed. For example, conventional 35 mm color slides typically are utilized in generating the color halftone reproductions that appear in newspapers, magazines and books. One embodiment of the invention that is arranged for operation with 35 mm color slides employs a raster color scanning unit that is identified as the Barneyscan Scanner and is manufactured by Barneyscan of Berkeley, Calif. This particular raster scanning unit utilizes charge-coupled device technology to scan the colored photographic image along 1000 scanning lines and provide digitally encoded color representative signals at 1000 consecutive positions in each scanning line (i.e., approximately 1,000,000 digitally encoded image pixel signals are provided).

Referring still to FIG. 1, the digitally encoded signals supplied by scanner unit 12 are provided to a color processor 22 of digital signal processor 10. In the arrangement of FIG. 1, color processor 22 implements two digital signal processing operations: conversion of the signals provided by scanner unit 12 into standard RGB signal format (indicated at block 24 of FIG. 1); and conversion of the signals provided by scanner unit 12 into digitally encoded signals representative of the intensity of the cyan, yellow, magenta and black components of the digitally encoded signals supplied by scanner unit 12 (represented by CYMK block 26 of FIG. 1). As is indicated by color processor unit 22 of FIG. 1, signals representative of the cyan, yellow, magenta and black components (continuous tone data for each of the color components in the four color halftone process) are obtained by processing the data that is digitally encoded in the RGB format. In this regard, although it is possible to obtain the digitally encoded continuous tone data by processing the signals provided by scanner unit 12, currently available scanning units provide RGB signal format.

As will be recognized by those skilled in the art, and as is indicated in digital signal processor 10 of FIG. 1, CPU 16, memory unit 18 and divider/multiplier 20 (if included in digital signal processor 10) are utilized in performing the digital signal processing described relative to signal processor 22. More specifically, the signal encoding to provide the RGB formatted signal (indicated at block 24 in FIG. 1) is performed by CPU 16 in accordance with instructions or programming stored in a portion of memory unit 18. Also, the RGB formatted signal is coupled to a color monitor 28 under the control of CPU 16 with memory unit 18 providing the required instructions or programming.

CPU 16 memory unit 18, and, if desired, multiplier/divider 20 also operate to perform the signal processing that results in the continuous tone representative signals for each of the four colors being utilized and shall be described in more detail, memory unit 18 stores digitally encoded continuous tone signals at times at which digital signal processor 10 operates to produce a halftone color separation for each of the four process colors. Both the continuous tone signal process that is indicated at 26 of FIG. 1 and the RGB signal processing that is indicated at block 24 of FIG. 1 can be implemented entirely by CPU 16 and memory unit 18 or by digital circuit arrangements that operate alone or in conjunction with a CPU 16 and memory unit 18. In this regard, when commercially available devices are employed as scanner unit 12 and digital signal processor 10, the digital signal processor is programmed by software that is supplied with the commercially available scanner unit or with other commercially available software that causes the digital signal processor to perform the RGB signal processing. For example, the previously mentioned environment in which the invention currently is practiced includes a Hewlett-Packard Vectra RS20 which utilizes the Raster Image Processor (30 in FIG. 1) in performing the signal processing operations of the invention. Software for programming this particular signal processor (and other similar devices) to provide the RGB formatted signals is supplied with the previously mentioned commercially available scanning device that is employed as scanner unit 12.

Also included in digital signal processor 10 of FIG. 1 is a raster image processor 30; (sometimes known in the art as a "RIP"). Like the previously discussed components of color processor 22, raster image processors that are implemented as software for programming a programmable digital signal processor, and raster image processors that include both discrete digital signal processing circuits and software controlled programmable digital signal processors are known in the art. Regardless of the exact manner in which a raster image processor is realized, the signal processing that is accomplished primarily consists of converting or transforming stored digitally encoded signals that represent the previously mentioned continuous tone information (for each of the four colors being used) into stored digitally encoded signals representative of the halftone screens (color separations) for each of the four colors. As indicated in FIG. 1, CPU 16 and memory unit 18 are connected to provide digital signals representative of the halftones both to a direct digital color position proofer 32 and to a digital data output device 34.

Direct digital color position proofer 32 functions to produce a hardcopy color reproduction of photo image 14 which is based on the digitally encoded halftone signals provided by raster image processor 30, and, hence, approximates the halftone image produced by the system. Various commercially available devices are suited for use as direct digital color position proofer 32. For example, a printer manufactured by Hewlett-Packard Company under the trademark Paint Jet has been incorporated in a system that operates in accordance with the invention. Regardless of the particular device employed, direct digital color position proofer 32 functions in combination with color monitor 28 to allow the system operator to observe system operation and monitor the general color quality that is being achieved. In this regard, the halftone images produced from the halftone screens that the system of FIG. 1 supplies will not be identical to the color image produced by direct digital color position proofer 32 because of differences in the two printing processes and the inks employed. However, the correspondence between the two color images is sufficient to allow the system operator to generally ascertain the quality of the color in the image that will result from the four color separations being produced, and, if necessary, adjust system parameters to improve the quality. Currently, control of a digital halftone system to improve the quality of the reproduced color image that results from halftone color separations screens that are produced by the system typically is effected by altering the RGB formatted signals with a keyboard or other input device (not shown in FIG. 1) being used to initiate and control the signal alteration process. Corresponding changes occur in the CYMK signals during the RGB-CYMK conversion process.

Digital data output device 34 of FIG. 1 is a conventional laser printer, laser image setter or similar device which produces halftone paper images or halftone photographic negatives for use in making the printing plates that are used in printing halftone color reproductions of color photo image 14. As shall be recognized upon understanding of the hereinafter discussed raster image processing of the invention, one specific advantage of the invention is that quality halftone color reproduction can be achieved with relatively low resolution digital data output devices. For example, commercially available Hewlett-Packard Laser Jet printers have been satisfactorily employed in four color halftone processing systems which are structured and operate in accordance with the invention. As is known to those skilled in the art, these particular output devices exhibit an output resolution of 300 resolution units per inch approximately 120 resolution units per centimeter). That is, a device such as the Hewlett-Packard Laser Jet printer is capable of imprinting a black spot (or dot) so that 300 such dots can be imprinted within a one-inch length in the vertical and horizontal direction. Although digital data output devices having a resolution of 300 resolution units per inch provide satisfactory results in many applications of the invention, in situations in which extremely high quality four color halftone reproduction is required, other commercially available devices having an output resolution on the order of 1000–3000 units per inch can be employed. One example of such a device is the Linotronic Model 300 Digital Image Setter, which produces a photographic negative from which halftone printing plates can be made.

FIG. 2 provides a summary of a portion of the above discussed basic aspects of a typical four color halftone processing system in which the invention can be practiced and, further, indicates additional aspects of such a system. As was previously discussed and as is indicated in FIG. 2, four color digital halftone systems that currently employ the invention first process the photographic image 14 to load RGB-formatted digitally encoded signals into a portion of memory unit 18 of digital signal processor 10 (identified as memory 18-1 in FIG. 2). As was previously mentioned, the digitally encoded RGB signals are supplied by digital signal processor 10, which processes signals provided by scanner 12 of FIG. 1, with conventional software (or, alternatively specifically designed software) being employed to program digital signal processor 10 so that RGB formatted digitally encoded signals are stored in memory space 18-1. In this regard, memory space 18-1 in effect is a rectangular array of storage locations, $p_{xi}$, $p_{yj}$, where $i=1, 2, \ldots$ and $j=1, 2, \ldots n$. It will be recognized by those skilled in the art that this type of memory arrangement commonly is employed in various devices which utilize raster scanning, with the information stored at each memory address $p_{xi}$, $p_{yj}$ of memory space 18-1 being representative of one pixel of the raster scanned image (e.g., photographic image 14 of FIG. 2). With specific regard to the storage of RGB-formatted signals in the arrangement of FIGS. 1 and 2, each memory address stores an ordered sequence of binary bits for the red, green and blue color content of a corresponding image pixel of photographic image 14. For example, the previously mentioned scanner unit that is employed in current systems that incorporate the invention provides what is known as 24 bit color since the signals representing the red, blue and green color content of the photographic image each consist of an 8 bit data word.

As was discussed relative to FIG. 1, the digitally encoded RGB signals are processed by digital signal processor 10 to obtain digitally encoded continuous tone signals representative of the cyan, yellow, magenta and black color content for incremental regions of the photographic image 14 being processed. FIG. 2 illustrates four portions of memory unit 18 of FIG. 1 (18-2, 18-3, 18-4 and 18-5). As is indicated in FIG. 2, each memory space 18-2, 18-3, 18-4 and 18-5 is similar to RGB memory space 18-1. Specifically, each memory space for storing continuous tone data representative of the cyan, yellow, magenta and black color content of the image being processed corresponds to a rectangular array where $x_i$ (i=0, 1, ..., n) indicates a row address and $y_j$ (j=0, 1, ..., n) represents a column address. In the practice of the invention each such address of memory 18-2, 18-3, 18-4 and 18-5 stores a set of binary bits (a digital word) that is representative of the brightness or intensity of the cyan, yellow, magenta or black content within a small incremental region of the photographic image 14 that is being processed. For example, each address within memory space 18-2 stores a digitally encoded signal representative of the brightness of the cyan content for a corresponding incremental region of photographic image 14. As was described relative to FIG. 1, signal processing is known in the art for producing such continuous tone data eithe from the stored RGB data (as is indicated in FIGS. 1 and 2) or, alternatively, directly from the raster scan signals provided by scanner unit 12 of FIG. 1.

As also was described relative to FIG. 1, the continuous tone digitally encoded signals for each of the four colors are processed by digital signal processor 10 to obtain digitally encoded signals representative of the halftone screen for that particular color. In FIG. 2, the digitally encoded halftone signals for the cyan, yellow, magenta and black halftones are illustrated as being stored in memory 18-6, 18-7, 18-8 and 18-10, respectively. In accordance with the invention, each memory space 18-6, 18-7, 18-8 and 18-10 is a bit map that represents the halftone image that will be produced by digital data output device 34. More specifically, each memory space is an ordered rectangular array in which a row of stored signals (e.g., $[(x_0, y_0)(x_0, y_1) \ldots (x_0, y_n)]$) represents a horizontal row of resolution units for the digital data output device (34 in FIG. 1) being employed. Stored in each memory element of the memory space is a binary 1 or a binary 0. Depending upon whether a binary 1 or a binary 0 is present, the digital data output device 34 of FIG. 1 operates to imprint the corresponding resolution unit of the halftone image being produced with black ink (or if the halftone screen medium is a photographic negative, expose the corresponding resolution unit of the photographic film). Thus, in effect, each memory space 18-6, 18-7, 18-8 and 18-10 corresponds to the array of resolution units of the digital data output device being used.

It should be recognized that the dimension of the memory 18-1 for storing the digitally encoded signals representative of the RGB data is not necessarily equal to the dimensions of the memory spaces for storing the continuous tone data (memory space 18-2, 18-3, 18-4 and 18-5) and the dimension of the memory arrays for storing the digitally encoded signals representative of the halftone data (memory arrays 18-6, 18-7, 18-8 and 18-10). In particular, and as was previously noted, the dimensions of memory space 18-1 for storing the RGB digitally encoded signals is established in accordance with the raster scanning of scanner unit 12 of FIG. 1, i.e., memory space 18-1 is dimensioned to accommodate the number of pixels in the scanned image. On the other hand, memory spaces 18-2, 18-3, 18-4 and 18-5 for storing the digitally encoded continuous tone signals for each of the four colors used in the process and memory spaces 18-6, 18-7, 18-8 and 18-10 for storing binary signals representative of the four halftone screens are dimensioned in accordance with the type of digital data output device (34 in FIG. 1) that is employed and in accordance with the desired screen ruling. In situations in which the number of digitally encoded RGB signals (and hence the number of image pixels) is not sufficient to provide the number of digitally encoded continuous tone signals and digitally encoded halftone signals (derived from the digitally encoded continuous tone signals), various conventional signal processing techniques can be employed to interpolate the RGB signals (or signals supplied by scanner Unit 12) in a manner that provides the desired number of continuous tone and halftone signals.

It also should be recognized that a four color halftone processing system that incorporates the invention need not simultaneously store all of the signals discussed relative to FIG. 2. For example, the stored digitally encoded continuous tone signals for cyan, yellow, magenta and black can be individually and sequentially processed to supply the associated digitally encoded halftone signals and a hardcopy output (color separation) is produced by digital data output device 34 of FIG. 1 with the processing associated with one color being completed before the processing associated with another color begins. On the other hand, as is done in the currently preferred embodiments, the signals for each color separation can be stored for batch output operation.

Turning now to the manner in which systems that are configured in accordance with the invention operate to produce the four halftone screens that are required for four color halftone printing, reference is initially made to FIGS. 3A–3D, which respectively illustrate a portion of a typical halftone screen for the colors yellow, cyan, magenta and black. As is shown in FIG. 3A, the halftone screen 36 that is associated with the yellow content of the image to be reproduced includes a rectangular array of halftone dots 38 which are equally spaced apart from one another by a distance d where 1/d is the halftone frequency or screen ruling. As also is shown in FIG. 3A, each row of the yellow representative halftone dots 38 forms a line of dots that is orthogonal to a vertical axis (e.g., the vertical edge of the photographic image being reproduced). As is known in the art, the area of each halftone dot 38 is established in accordance with the intensity or brightness of the yellow color content for a corresponding incremental region of the photographic image being reproduced. That is, each halftone dot 38 of yellow halftone screen 39 occupies a portion of a square spatial region 39 which is associated with a corresponding spatial region of the photographic image being processed, with the size of the halftone dot 38 representing the intensity or brightness of the yellow component of the photographic image for that particular spatial region.

As can be seen in FIGS. 3B-3D, the halftone screens for the magenta, cyan and black color components of the image being reproduced also include a plurality of halftone dots that are orthogonally spaced apart from one another by a distance d, with each halftone dot being located at the center of small square spatial regions. As is the case with halftone dots 38 of halftone screen 36, the area of each individual halftone dot is proportional to the brightness of the associated color component for regions of the image being reproduced that correspond to the incremental square regions of the halftone screens. That is, the size or area of each halftone dot 42 of screen 40 in FIG. 3B is proportional to the brightness or intensity of the cyan component within a small incremental region of the image being produced that corresponds to the square spatial region within which that particular halftone dot 42 is located. Likewise, the size of each halftone dot 46 and 50 of halftone screen 44 and halftone screen 48, which are illustrated in FIGS. 3C and 3D, respectively, indicate the brightness and intensity of the magenta and black color components for corresponding incremental regions of the image being processed.

As is known to those skilled in the art, the primary difference between the cyan, yellow, magenta and black halftone screens is the screen angle utilized in the respective screens; i.e., the angle at which an imaginary line that extends through a row or column of the halftone dots intersects with a line that corresponds to the vertical direction in the image being processed. More specifically, to spatially separate the halftone dots from one another in the printed reproduction, different screen angles are employed in the four color separations. Further, it is known in the four color halftone processing art that failure to maintain a 30° difference between the screen angles for the cyan, magenta and black halftone screens can cause an interference pattern (moiré) in the resulting halftone color reproduction that is highly discernible and renders the reproductions of little or no value. On the other hand, properly controlling the screen angles resulted in a subdued, rather pleasing pattern known in the art as a rosette.

Although the screen angle for the yellow halftone screen must differ from the screen angles for the other three halftone screens to thereby provide spatial separation between the yellow halftone dots and the three other arrays of halftone dots when the printing process is implemented, the screen angle for the yellow halftone screen is less critical than the screen angle of the three remaining halftone screens. Traditionally, monochrome screens utilize a 45° screen angle. Thus, it has become customary in four color halftone processing to utilize a 45° screen angle for the black halftone screen, with screen angles of 105° and 75° being utilized for the cyan and magenta halftone screens, respectively. By custom, the yellow halftone screen angle is 90°. Each of these customary screen angles is indicated in FIGS. 3A-3D.

In view of FIGS. 3A-3D, it can be recognized that there are two primary aspects of the signal processing discussed relative to raster image processor 30 of FIG. 1. First, the stored continuous tone data for each of the four colors (stored intensity values) must be processed to obtain four halftone screens in which the size of each halftone dot is proportional to the brightness or intensity of a corresponding incremental region of the photographic image being processed. Second, the signal processing must properly position the halftone dots of each of the four screens to maintain constant screen ruling and the desired screen angle.

As is known to those skilled in the art, one technique that is utilized in digital halftone systems to produce halftone dots that approximate those produced with traditional photographic methods is known as dithering. This technique utilizes a square dither matrix of threshold values that is repeated as a regular array to provide a threshold pattern for the entire image being reproduced. The digital signal processing that is then performed to produce a halftone screen conceptually corresponds to superimposing the array of dither matrices over an identically dimensioned array in which the array elements correspond to the stored continuous tone intensity values. The dither matrix threshold values are then compared to the continuous tone intensity values and, if the continuous tone intensity value exceeds the corresponding dither matrix threshold value, a corresponding bit of a memory map (e.g., in processing the yellow continuous tone data in FIG. 2, an addressed bit of memory space 18-7) is set (e.g., made equal to a binary 1). By judiciously selecting the dither matrix threshold values, a "growth sequence" is established in which increasing levels of continuous tone intensity values cause an increase in the number of memory bits that are set, with the set bits occupying contiguous positions in memory space (i.e., the bit map). When processed by the system digital data output device, the dither matrix thus produces a cluster or group of activated output device resolution units (inked areas or developed photographic regions) so that an approximation to a halftone dot of the proper size is formed in the halftone screen.

As is known to those skilled in the art, use of the above-discussed dither technique increases the intensity resolution of the digital halftone process by sacrificing spatial resolution. In this regard, use of a $d \times d$ dither matrix decreases the spatial resolution obtainable with a bit mapped representation of a photographic image by a factor of d. That is, the halftone screen ruling that results with a $d \times d$ dither matrix is r/d, where r is equal to the number of resolution units per unit length of the digital data output device being employed. However, use of a $d \times d$ dither matrix increases the number of intensity levels that are included in the halftone screen by a factor of $d^2 + 1$ because each halftone dot that is produced by the dither technique can include from 0 to $d^2$ activated output device resolution units.

Since the yellow halftone color separation in conventional four color halftone color processing utilizes rows of halftone dots that are orthogonal to the vertical axis of the color separation, the digital dither technique can be readily implemented. For example, in systems in which the invention is currently practiced, digitally encoded continuous tone signals representative of the yellow content of the image being reproduced in effect are stored as a rectangular array in which row addresses correspond to horizontal lines of continuous tone information and column addresses correspond to vertical lines of continuous tone information. In these systems, rows of the memory space that store the digitally encoded continuous tone signals are accessed one after another with each digitally encoded continuous tone signal with an accessed value row being processed in sequence by comparing the stored continuous tone intensity value with a corresponding element of the dither array, and, if appropriate, setting a corresponding bit of the yellow halftone separation memory map. In one satisfactory method of accomplishing this signal processing, the remainder of the ratio $x_i/d$ is determined, where $x_i$ denotes the row number of the stored continuous tone signals and d represents the dimension of the dither array. The remainder, $r_i$ then indicates the row in which the corresponding dither element $d_{ij}$ is located. The column location of the corresponding dither element is determined in a similar manner. Specifically, when each particular digitally encoded continuous tone signal, $x_i, y_j$ is being processed, the remainder of the ration $y_j/d$ is determined, with the remainder $r_j$ representing the column address of the corresponding element of the dither matrix. Thus, for each stored continuous tone signal, $x_i, y_j$, the digital processing system simply accesses the threshold values stored at $r_i$, $r_j$ and compares the threshold value stored at that position of the dither matrix with the intensity value at the continuous tone address $x_i$, $y_j$. If the stored continuous tone intensity value exceeds the dither threshold, sets the $x_i$, $y_j$ bit of the yellow halftone screen memory map is set (the $x_i$, $y_j$ bit of memory space 18-7 of FIG. 2 is set equal to a binary 1).

FIG. 4 illustrates an $8 \times 8$ dither matrix that currently is used in the practice of this invention in processing the digitally encoded signals representative of the yellow color content of an image being reproduced to generate a yellow halftone screen. As can be seen in FIG. 4, the threshold intensity values assigned as the various elements of the $8 \times 8$ dither matrix range from 0-63, with the higher threshold values being assigned to dither matrix elements that lie outward from the central region of the dither matrix. In particular, threshold values 0, 1, 2, and 3 are assigned to the four centrally located elements of the dither matrix, and the remaining threshold values (4 through 63, inclusive) are assigned so that each increasing intensity level is associated with an element of the dither matrix that borders a group of dither matrix elements that is associated with all lesser valued threshold values. For example, threshold values 4 through 15, inclusive, are assigned to the rectangular band of twelve dither matrix elements that surrounds the square pattern formed by the centrally located intensity values 0 through 3. Further, the threshold value assigned to each element of the dither matrix of FIG. 4 is selected to provide a growth sequence in which an orderly approximation to conventional halftone dots is achieved.

Dither matrix patterns associated with six uniform levels of continuous tone intensity are illustrated in FIGS. 5A-5F, with the shaded areas of the figures indicating bits of the halftone screen memory map that will be set for six separate continuous tone conditions. For example, as is shown in FIG. 5A, if the continuous tone intensities associated with each element of the dither matrix of FIG. 4 is 4, the dither pattern is a rectangle formed by the four innermost elements of the dither matrix of FIG. 4 (threshold values 0, 1, 2 and 3). An increase in the continuous tone intensities causes a corresponding increase in the number of dither matrix elements that will set a bit of the continuous tone memory map, with FIGS. 5B-5F, respectively, indicating symmetrical patterns of dither matrix elements that will set corresponding bits of the memory map when the continuous tone intensity level is 12, 16, 32, 40 and 44. As will be recognized, continuous tone intensity levels other than those indicated in FIGS. 5A-5F produce patterns in which the number of dither matrix elements that are less than the continuous intensity level correspond to the continuous tone intensity so that a corresponding number of bits of the memory map are set and form a geometric pattern.

It should be understood that the dither matrix shown in FIG. 4 is not the only dither matrix that can be employed in the practice of the invention. First, as previously mentioned, dither matrices of various dimension can be employed, with the dimension of the dither matrix being primarily selected in view of the range of continuous tone intensities that are to be processed and included in the four color halftoning process. Second, regardless of the dimension of the dither matrix being employed, the above-discussed considerations for organizing the dither matrix do not result in a unique dither matrix configuration. For example, with respect to the dither matrix of FIG. 4, it can be seen that the patterns shown in FIG. 5 will also be obtained with various dither matrices in which the threshold values are rearranged or scrambled relative to the dither matrix arrangement of FIG. 4. Further, satisfactory results can be obtained with a dither matrix that provides patterns that differ from those shown in FIG. 5.

Although various dither matrix arrangements can be employed that provide a desirable growth sequence, in the practice of the invention the preferable dither matrices (e.g., the $8 \times 8$ dither matrix of FIG. 4) are selected in view of the halftone representation that is achieved when various uniform continuous tone intensity levels are considered. In particular, in developing the dither matrix shown in FIG. 4, a proposed dither matrix first was established using the criteria that increasing continuous tone intensities will establish a growth sequence in which the pattern formed by dither matrix elements that are less than a predetermined continuous tone intensity level forms a cluster that increases systematically as the continuous tone intensity level increases (e.g., the patterns shown in FIGS. 5A-5F). The effectiveness of the proposed dither matrix then was determined by producing halftone screens for each continuous tone intensity level within the range of continuous tone intensity levels. The halftone screens were then examined for uniformity of appearance and representation of a shade of grey (proper grey scale). Any lack of uniformity (discernible patterning) of the halftone screens then was eliminated or reduced to the extent possible by rearranging the threshold values within the dither matrix. Since, as shall be described below, the invention also employs the dither matrix used in generating the yellow color separation in producing cyan and magenta color separations, the above-discussed empirical technique for verifying and further optimizing the selected dither matrix also included examination of cyan and magenta halftone screens for various uniform levels of continuous tone intensity, and rearrangement of the dither matrix to provide the best overall results was made.

As was previously described, processing of the digitally encoded continuous tone signals representative of the yellow content of the image being processed is a relatively straightforward process since the stored continuous tone signals correspond to vertical lines and columns of continuous tone information of the image being processed. Since the halftone dots of the cyan, magenta and black color separations are oriented to achieve screen angles of 105°, 75°, and 45°, respectively (FIGS. 3B-3D), accommodation must be made in a digital color halftoning system in order to achieve the proper screen angle for each of these color separations while simultaneously maintaining proper screen ruling.

As shall be described hereinafter, in accordance with this invention, two separate signal processing techniques are applied with the first technique being applied in processing that results in the cyan and magenta halftone separations and a second processing technique being applied to obtain the black halftone separation.

The first signal processing technique (cyan and magenta color separation processing) utilizes the previously discussed dither matrix technique, with the currently preferred embodiments of the invention utilizing the 8×8 dither matrix of FIG. 4. The second signal processing technique (black halftone separation) utilizes a specially configured dither array of a dimension that is different than the dimension of the dither matrix utilized in processing the cyan, yellow and magenta stored continuous tone signals.

Figure 6:
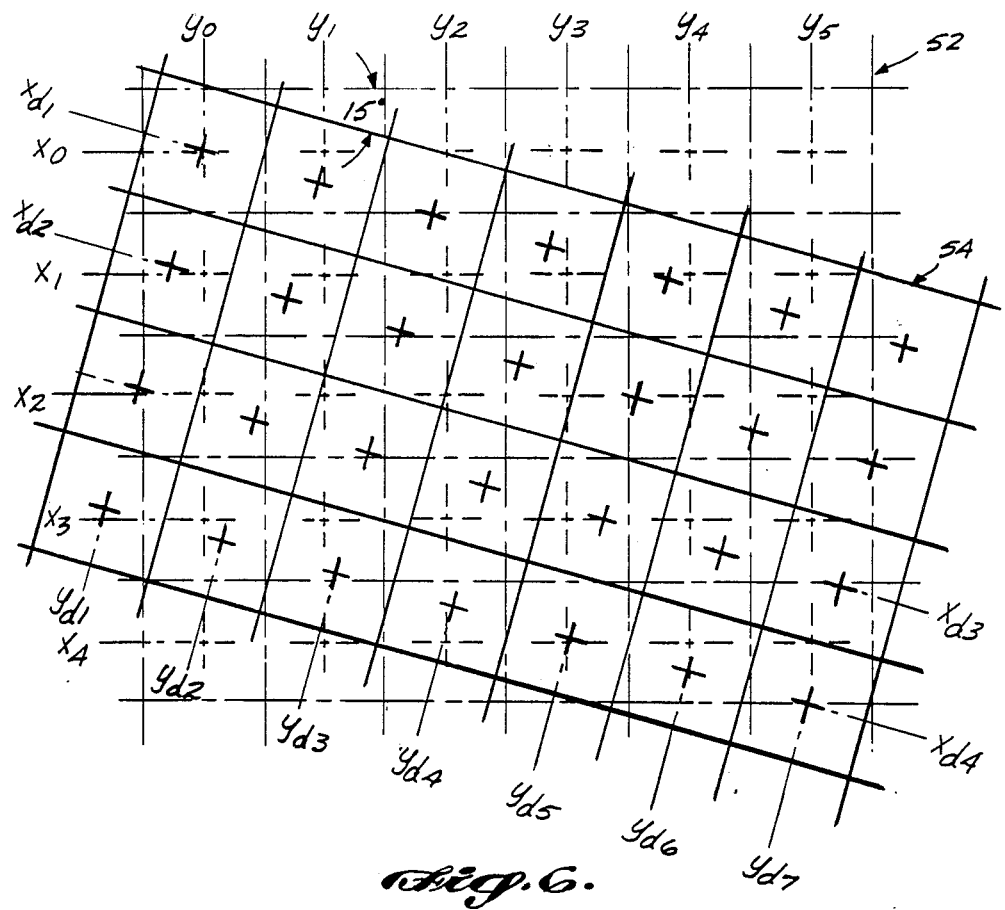
FIG. 6 diagrammatically depicts rotation of elemental areas of continuous tone information through an angle of 15° to thereby conceptually illustrate one aspect of the signal processing utilized in the practice of the invention to obtain digitally encoded signals for the magenta and cyan color separations.

The conceptual bases for signal processing utilized in the practice of the invention to generate the cyan and magenta color separations can be understood with reference to FIG. 6. Shown in FIG. 6 is a rectangular grid or array 52 which consists of rows and columns of identically sized square cells, $x_i$, $y_j$, where $i = 0, 1, \ldots 4$; $j = 0, 1, \ldots 5$; and $x_i$, $y_j$ represents the Cartesian coordinates of the center point of each particular cell of grid 52. Since, as previously described, the four color halftone processing system of FIG. 1 stores signals representative of the continuous tone signals or rows and columns of incremental spatial regions of the image being processed, grid 52 can be considered to be a representation of a portion of the image being processed (e.g., the upper left hand corner of photographic image 14 of FIGS. 1 and 2).

Also shown in FIG. 6 is a rectangular grid 54, which consists of rows and columns of square cells that are identical in size to the cells of grid 52. As is indicated in FIG. 6, the Cartesian coordinates of the center point of each cell of grid 54 can be expressed as $x_{di}$, $y_{dj}$, where $i = 1, 2, \ldots 5$, and $j = 1, 2, \ldots 7$. As also is indicated in FIG. 6, the spatial orientation between grid 54 and 52 is such that the center points of the upper left hand elemental region of each grid are coincident (i.e., $x_0 = x_{d1}$ and $y_0 = y_{d1}$) and, in addition, grid 54 is rotated 15° clockwise relative to grid 52. Since each row of cells within grid 52 is perpendicular to a vertical reference line of the image being processed (e.g., the vertical border of the photographic image being reproduced), it thus can be recognized that each row of elements in grid 54 forms a 105° angle with the vertical end, thus, is at the proper screen angle for the cyan halftone screen.

As was previously mentioned, the application of dither technique to the digital production of halftone screens conceptually corresponds to superimposing a dither matrix on a grid-like representation of the incremental regions for which continuous tone row and column information is to be processed. Thus, it can be seen that grid 54 of FIG. 6 corresponds to a portion of a dither matrix (i.e. first four rows and first seven columns) that is indexed to the upper left hand corner of the depicted continuous tone region of an image being processed (represented in FIG. 6 by grid 52). Moreover, it can be recognized in FIG. 6 that the Cartesian coordinates of the center points of dither matrix elements in grid 54 can be determined by rotating the center points of the continuous tone elements (center points of the cells on grid 52) clockwise by 15°. Thus, rotation of the center points of the continuous tone incremental regions in effect corresponds to mapping the center points from the Cartesian coordinate system that is associated with the continuous tone elements (two dimensional "continuous tone space") into the rotated Cartesian coordinate system associated with a dither matrix that is oriented at the proper screen angle for a cyan halftone color separation (two dimensional "dither space").

Specifically, it can be shown that the Cartesian coordinates of the center points of the dither cells of grid 54 can be expressed as:

$$x_{d(i+1)} = x_i \cos A - y_j \sin A$$

$$y_{d(j+1)} = x_i \sin A + y_j \cos A$$

where, $x_i$, $y_j$ represents the Cartesian coordinates of the center points of continuous tone cells (grid 52) with $x_0$, $y_0$ corresponding to the origin of the Cartesian coordinate system (i.e., $x_0$, $y_0$ is the point about which grid 54 is rotated);

and where, A represents the angle of counterclockwise rotation (i.e., $A = 345°$ in FIG. 6).

The manner in which the above-discussed transformation or mapping from continuous tone space to dither space used in the practice of the invention can be understood by considering the signal processing technique employed in sequentially processing the first row of continuous tone intensity values (i.e., the continuous tone intensity values associated with the first row of cells in grid 52 of FIG. 6). Specifically, in the practice of the invention, signal processing of the stored continuous tone signals that represent the cyan color content of the image being processed begins with access being made to the first row of continuous tone signals (i.e., row $x_0$ in grid 52 of FIG. 6 and memory space 18-3 in FIG. 2), with the processing proceeding sequentially relative to the stored continuous tone intensity values (i.e., $y_0$, $y_1$, $y_2$, ...). As each continuous tone intensity value, $x_0 y_j$; $j = 0,1,2, \ldots n$) is accessed, signal processing is effected to determine the Cartesian coordinates $x_{d1}$, $y_{dj}$. Both the $x_{d0}$ and $y_{dj}$ coordinate values are then rounded off to the nearest integer value and the threshold value associated with that address of the dither matrix is accessed and compared to the continuous tone value $x_0$, $y_j$. The continuous tone value $x_0$, $y_j$ is then compared with the accessed dither threshold value and a corresponding bit $x_0$, $y_j$ is set if the continuous tone value is less than the dither threshold value. For example, when $x_0$, $y_4$ of grid 52 in FIG. 6 is rotated 15° clockwise (345° counterclockwise), the Cartesian coordinates of the rotated point are $x_{d1} = 1.03528$ and $y_{d5} = 3.86372$ (calculated with trigonometric functions of accuracy to the 5th place). Thus, the rounded values are $x_{d1} = 1$; $y_{d5} = 4$. As can be seen from FIG. 6, with reference to the transformation from continuous tone space to dither space, this means that the rotation required to obtain the proper screen ruling and screen angle for the cyan halftone color separation results in the continuous tone value that is associated with the first row of continuous tone values ($x_0$ in FIG. 6 and memory space 18-2 of FIG. 2) to be associated with the dither threshold in the first row and fourth column of the dither matrix being employed (e.g., dither threshold = 36 in the previously discussed dither matrix of FIG. 4). Thus, in an embodiment of the invention utilizing the dither matrix of FIG. 4, the bit located in the first row ($x_0$ of memory space 18-6 in FIG. 2) will be set if the continuous tone intensity value stored in the first row ($x_0$) and fifth column ($y_4$) of memory space 18-2 in FIG. 2 exceeds 36.

As was previously noted, the center points of the first row of cells in grid 52 lie on a line that corresponds to the desired screen angle of 105°. Because the coordinate values of the rotated center points are rounded to the next closest integer, it can be recognized that sequentially processing the continuous tone values that are located in the first row of memory in effect corresponds to moving along a path that is the best available approximation to the desired screen angle. Further, it can be recognized from FIG. 6 that sequentially processing the continuous tone values that are stored in subsequent rows of memory space (i.e., rows $x_0, x_1, x_2, \ldots, x_n$ in memory space 8-6 of FIG. 2) in effect corresponds to moving along a path in dither space that is the best available approximation to a line that exhibits both the desired screen angle and screen ruling.

In the practice of the invention, the number of continuous tone signals processed for each row of stored signals substantially exceeds the number of threshold values in a row of the dither matrix. Thus, the signal processing used with each row of continuous tone signals operates on a module n basis where n is the dimension of the dither matrix being employed. In particular, module n operation is used as each set of dither space coordinates $x_{(d+1)}, y_{(j+1)}$ are determined and rounded to the nearest most integers. For example, in currently preferred embodiments which employ the 8×8 dither matrix of FIG. 4, the dither space coordinate x and y indices in effect are divided by 8 and only the remainder is considered (no remainder in effect being treated as 8). Thus, the dither space x and y coordinates become repeating sequences (1,2,...,8), i.e., sequences ranging from 1 to n, so that dither space for processing the cyan intensity values corresponds to an array of identical dither matrices.

Referring again to FIG. 6, it can be noted that the y coordinate for one or more cells of grid 54 is less than 0 for those cells of grid 54 that have an x coordinate equal to or greater than $x_2$. In the practice of the invention, negative coordinate values are processed in a manner that preserves the above-described continuous tone space/dither space relationship. For example, in the currently preferred embodiments of the invention, negative coordinate values are converted to positive coordinate values of the same magnitude (the absolute value of the coordinate value is used). In effect, this establishes a dither matrix for negative x coordinate values that is a mirror image of the system dither matrix. For example, with respect to the 8×8 dither matrix of FIG. 4, the columns of dither elements are interchanged so that $y_{d'j} = y_{d(9-j)}$, where the index d'j represents the column number in the dither matrix for x coordinates that are less than 0. Although processing the signals in this manner will result in a slightly different growth sequence for halftone dots that are formed entirely or in part by continuous tone values that have negative dither space x coordinate values, it has been found that this technique has little or no effect on the cyan halftone color separation or on the resulting reproduced photographic image. As will be recognized by those skilled in the art, identical dither matrices can be established for both positive and negative dither space coordinates with a slight increase in the necessary signal processing. For example, this can be achieved by additional signal processing in which the absolute value of each rounded negative x component in dither space is subtracted from (n+1), where n represents the dimension of the dither matrix. Another alternative is to translate the depicted coordinate system so that negative coordinate values do not appear.

In the currently preferred embodiments of the invention the above-discussed signal processing is effected in a manner that enhances both signal processing efficiency and speed. First, as previously mentioned, the traditional screen angle for the magenta halftone color separation is 75°. Thus, the above-discussed signal processing that results in a stored bit map that is representative of the cyan halftone color separation is directly applicable and is utilized in the practice of the invention to generate the magenta halftone color separation. In particular, it can be recognized that rotation of the Cartesian coordinates of the stored magenta continuous tone information (e.g., rotation of memory space addresses $x_i, y_j$, where i=0,1,...n; j-0,1,...n of memory space 18-3 in FIG. 2) clockwise by 15° in effect transforms the magenta continuous tone intensity values into dither space in a manner that will result in proper screen angle and screen ruling for a magenta halftone color separation.

The currently preferred embodiments of the invention utilize matrix representations in the signal processing that provides the above-discussed rotation. More specifically, the currently preferred embodiments utilize homogeneous coordinates in which each of the above-discussed row and column positions are expressed as a three-element row vector $[x_i y_j 1]$. Since each coordinate (address in memory space) is a three-element row vector, the transformation matrix utilized in rotating the coordinates into dither space is $$R(A) = \begin{bmatrix} \cos A & \sin A & 0 \\ -\sin A & \cos A & 0 \\ 0 & 0 & 1 \end{bmatrix}$$

where, as previously noted, A represents the angle of rotation (345° for the cyan halftone color separation, and 15° for the magenta halftone color separation). Thus, it can be noted that the rotated coordinates (dither space coordinates $x_{di}, y_{dj}$) are provided by matrix multiplication of the row vector representing the point to be rotated and the rotation matrix R(A). As will be recognized by those skilled in the art, this operation is easily implemented in programmed digital signal processors and, further, in other embodiments of the invention, conventional circuitry is available that will readily implement the operation of matrix multiplication.

To provide additional signal processing speed and efficiency, the currently preferred embodiments of the invention utilize what often is referred to as an incremental algorithm. More specifically, the incremental algorithm employed in the currently preferred embodiments eliminates the need for determining the transformed coordinates for each and every continuous tone intensity value being processed. In particular, with reference to FIG. 6, it can be noted that when the coordinates of a particular center point of grid 54 are known, the coordinates of the next most center point in that particular row of center points can be defined as $x_{i+1} = x_i + dx;\ y_{j+1} = y_j + dy$, where dx is equal to the change in x coordinate value between two adjacent center points in any row in dither space (grid 54), and dy is equal to the change in y coordinate value between any two adjacent center points in any row in dither space. To implement this incremental technique, the signal processing that is utilized in currently preferred embodiments of the invention rotate two adjacent sets of coordinate values (e.g., $x_0$, $y_4$ and $x_1$, $y_4$) through the appropriate angle (345° for the cyan halftone color separation; 15° for the magenta halftone color separation to determine the value of dx and dy). The dither space coordinate values for each stored continuous tone intensity value are then accessed one by one; the x and y coordinate values of the accessed continuous tone value are incremented by dx and dy; the incremented coordinated values are rounded; and the previously discussed comparison is made between the continuous tone intensity level that is associated with the original coordinate values and the dither threshold values that are associated with the rounded dither space coordinate values.

One other technique that is employed in the currently preferred embodiments of the invention to provide additional speed and efficiency is elimination of the need to perform floating point operations during the signal processing. Specifically, during the signal processing sequencing, the decimal portion of the dither space x and y coordinates is eliminated by an operation that is commonly known as "left shift" (multiplication), with identical left shift being applied to the values of dx and dy. Right shift (division) then is performed relative to the resulting dither space coordinates $x_{(d+1)}$, $y_{(j+1)}$ and the above-described module n operation is performed to provide the dither space threshold value associated with the particular continuous tone signal being processed.

It has been found that the above discussed signal processing provides satisfactory results in producing the cyan and magenta halftone color separations, but will not produce black halftone separations of the desired quality. More specifically, as can be seen in FIG. 6, the continuous tone space/dither space transformation that is utilized in signal processing of the cyan and magenta continuous tone values does not result in a one-to-one correspondence between continuous tone values and dither matrix threshold values. For example, as can be seen from FIG. 6, the rounded dither space coordinates for both the continuous tone values that are associated with coordinates $x_0$, $y_2$ and $x_1$, $y_2$ are $x_1$, $y_2$. Because of this association of a single dither space threshold value with two separate continuous tone values, no continuous tone value is associated with the dither matrix value having rounded coordinates $x_2$, $y_2$ in FIG. 6. Although this means that there is a small loss of fidelity in the cyan and magenta halftone screens that are produced by the invention, there is negligible effect on the reproduced image that results from the use of those halftone screens. However, it can be shown that the loss of fidelity increases as the angle formed between the horizontal rows of continuous tone intensity values and the transformed coordinates (e.g., row $x_{d1}$ in FIG. 6) increases, with the maximum loss of fidelity occurring at an angle of 45° (the screen angle for the black halftone separation). Thus, in accordance with this invention, the signal processing technique that is utilized to obtain the cyan and magenta halftone color separations is not utilized to obtain the black halftone color separation.

As shall be described in detail relative to FIGS. 7-11, the signal processing utilized in the practice of the invention to establish a black halftone color separation is based on establishing a square m×m dither array which includes a plurality of halftone dither cells with the halftone dither cells being arranged for correspondence with the desired screen ruling (identical to the screen ruling of the cyan, yellow and magenta halftone color separations) and the desired screen angle (45°). In addition, the dither cells are arranged so that repeating the dither array in both the x and y coordinate directions (modulo m operation) results in an overall pattern of halftone dither cells in which each dither cell exhibits a growth sequence that results in the desired direct relationship between halftone cell size (area) and continuous tone intensity values.

Figure 7:
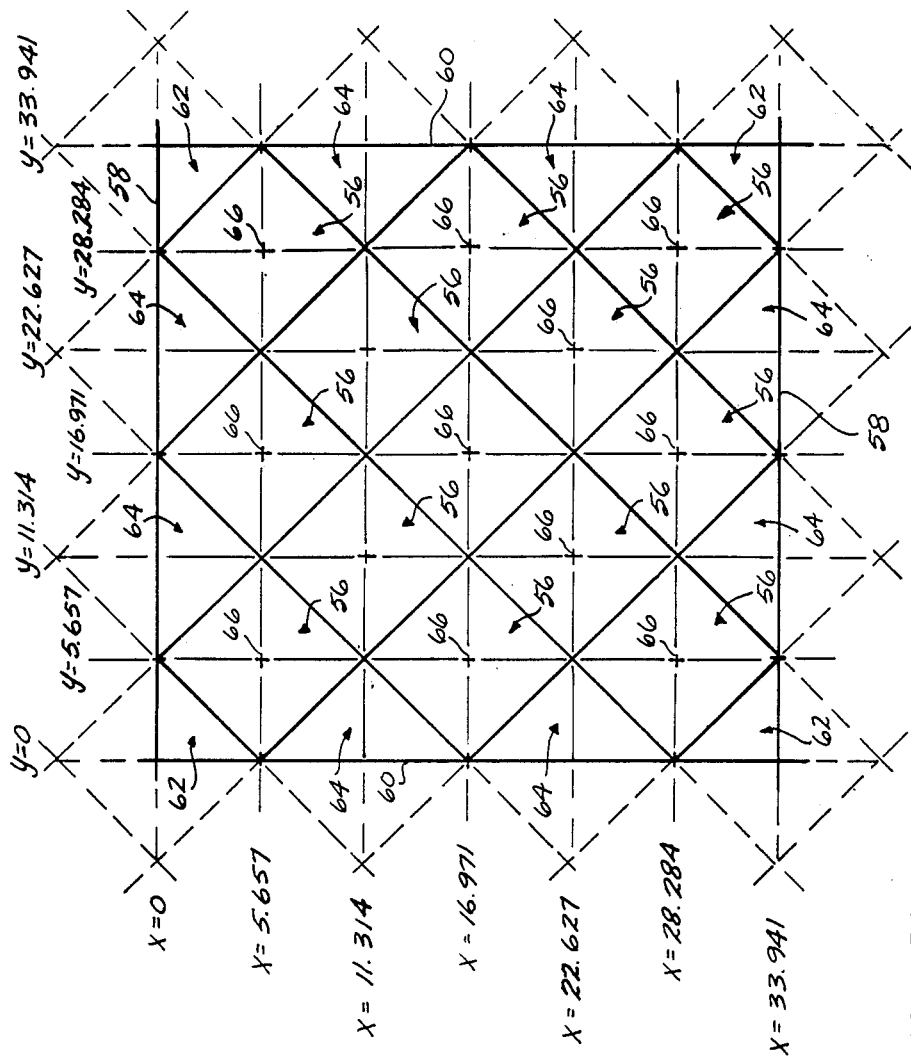
FIG. 7 diagrammatically depicts an array of dither matrices that is useful in understanding the manner in which the invention operates to supply a halftone color separation that represents the black color component of the image being reproduced.

FIG. 7 depicts the basic features of a dither array that is used in the currently preferred embodiments of the invention to provide a repeating pattern of halftone cells that exhibit the proper screen angle of 45° and screen ruling that corresponds to the screen ruling of the previously discussed cyan, yellow and magenta color separations that are produced by the currently preferred embodiments. Shown in FIG. 7 is a grid of square cells 56 having boundary lines that intersect the x and y axis of the depicted Cartesian Coordinate system at an angle of 45°. As can be seen in FIG. 7, the pattern formed by square cells 56 is such that the outer vertices of 13 square cells 56 can be interconnected with horizontal lines 58 and vertical lines 60 which collectively form a square. Ten partial cells (quarter sections 62 and half sections 64 in FIG. 7) are thus formed along the interior periphery of the square (along horizontal and vertical lines 58 and 60). As is indicated by dashed lines in FIG. 7, when the same pattern is repeated above, below, to the left of the illustrated square pattern, the partial cells form cells that are identical in size to cells 56 and, in addition, are aligned therewith.

With continued reference to FIG. 7, because the boundaries of cells 56 intercept horizontal and vertical lines 58 and 60 at an angle of 45°, it can be recognized that the length of each segment of lines 58 and 60 that defines the depicted square is $3n\sqrt{2}$, where n denotes the length of each side of the square cells 56. Thus, considering the case in which each square cell 56 is a 8×8 dither matrix so that one halftone dot is produced in each cell 56, it can be recognized that the arrangement of FIG. 7 establishes a dither array which will produce a 45° screen angle (the required screen angle for a black halftone color separation) with the screen ruling being identical to that used in the currently preferred embodiments of the invention for cyan, yellow and magenta halftone color separations.

Certain approximations must be made in applying the arrangement of FIG. 7 as a dither array. Specifically, as is indicated in FIG. 7, the length of these portions of horizontal and vertical lines 58 and 60 that bound the repetitive pattern of square cells 56 is 33.941. Thus, in terms of the coordinate system of FIG. 7, the repetitive pattern of square cells 56 extend between the x and y coordinate axes and the lines y=33.941 and x=33.941. As also is shown in FIG. 7, the center points 66 of the square cells 56 that lie within the interior region of the depicted pattern are defined by the intersection between lines x=5.657, x=16.971, x=28.284 and the lines y=5.657, y=16.971, y=28.284 (defines nine square cells 56) and the intersection between the lines x=11.314, x=22.627 and the lines y=11.314, y=22.627 (defines four square cells 56). As previously described, in effect the invention utilizes what can be considered to be square resolution units of the medium on which the halftone color separation is produced with a memory map being established in which each bit location corresponds to one resolution unit of the digital output device being employed. Thus, for application of the pattern shown in FIG. 7 as a dither array, the length of each side of the outer square pattern must be an integer and each center point of a square cell 56 (halftone cell) must be defined by integer coordinate values.

Figure 8:
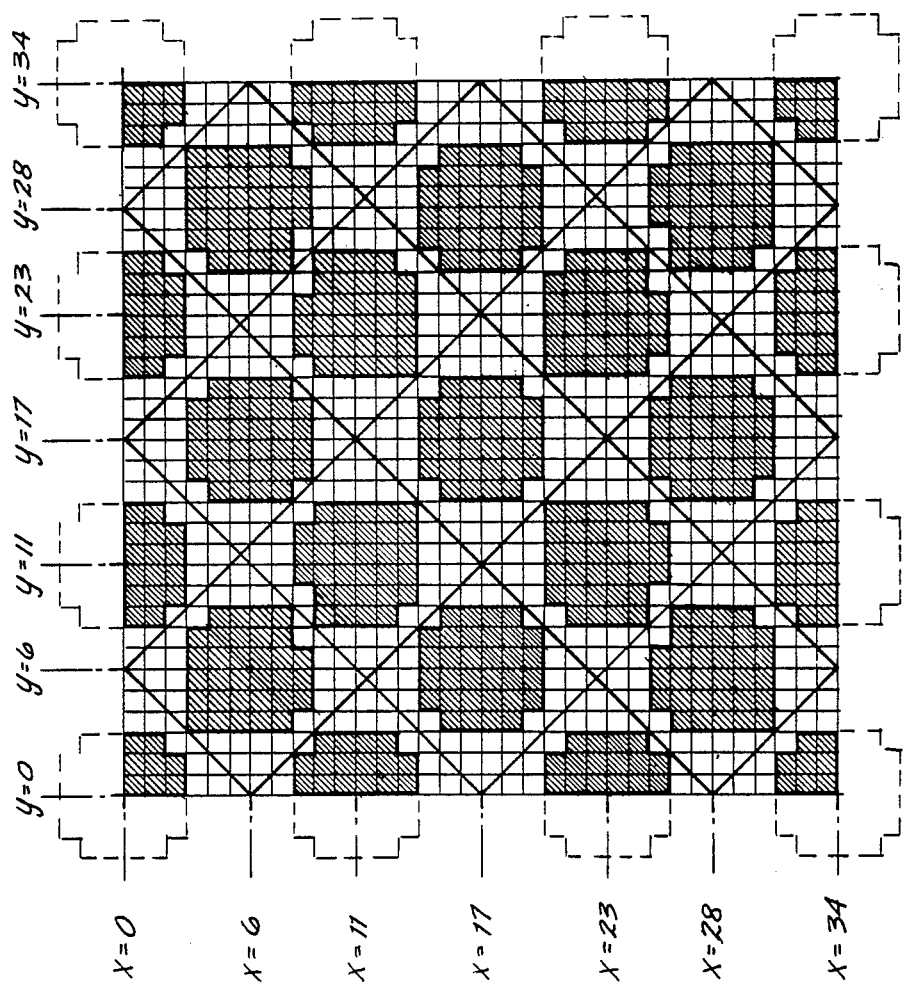
FIG. 8 further illustrates the array of dither matrices shown in FIG. 7 and depicts an arrangement of halftone dither cells which are used in processing continuous tone intensity signals when the intensity level of the black color component continuous tone signals is less than a predetermined level.

FIG. 8 illustrates the effect of rounding the outer boundary of the pattern of FIG. 7 to 34 units and rounding each of the center point coordinates to the nearest integer value. Specifically, in FIG. 8, the center points 66 of the halftone cells are defined by the intersection of the coordinate lines $x=6$, $x=17$, $x=28$ with the coordinate lines $y=6$, $y=17$, $y=28$ (defines nine of the centrally located halftone cells) and by the intersection of the coordinate lines $x=11$, $x=23$ with the coordinate lines $y=11$, $y=23$ (defines the four remaining centrally located halftone cells). As also is shown in FIG. 8, the quarter section and half section halftone cells lie along the boundaries of the depicted dither array, which are defined by $x=0$, $x=34$, $y=0$ and $y=34$.

The result of the necessary approximation is that the halftone cells shown in FIG. 8 are not of uniform size and are not of a size that exactly corresponds to the size of a halftone cell for an $8 \times 8$ dither matrix. Specifically, with reference to the thirteen complete halftone cells that are included within the boundaries of the repeating dither array of FIG. 8, the three cells that have center points on the line $x=28$ are actually rectangular having edges approximately equal to 7.81 and 8.485 units and the remaining ten complete halftone cells are square, having boundary edges of approximately 7.78 units. In addition, when the dither array of FIG. 8, is repeated to form a large halftone cell configuration, the halftone cells formed by the quarter sections (62 in FIG. 7) are square with each boundary edge being approximately 8.485 units and the halftone cells formed by the half sections (64 in FIG. 7) are rectangular with edges of approximately 8.485 and 7.81 units. In terms of the position of the center points of the halftone cells in FIG. 8, this results in a slightly non-uniform screen ruling in which the distance between the halftone cell center points is not exactly equal to eight units.

Even with the above-discussed approximations, it can be recognized that the overall variance between the dither array of FIG. 8 and the ideal geometric pattern shown in FIG. 7 is very low. For example, the ideal geometric arrangement of FIG. 7 encompasses 1,152 small cells (1,152 continuous tone values and halftone output resolution units) whereas the dither array of FIG. 8 includes 1,156 small cells. Further, it can be noted that the difference between the repeating pattern dimension in FIG. 7 and FIG. 8 is approximately 0.059 units. Thus, signal processing implementation of the dither array of FIG. 8 by use of modulo 34 processing results in an error (loss) of one continuous tone intensity value for each 578 intensity values that are processed. Thus, in a halftone reproduction that includes approximately 1,000 digital data output device resolution units per horizontal scan, no more than two intensity values will be lost per line of processed information (in each row of the memory map that represents the halftone black color separation). Additionally, as shall be described relative to use of alternative dither arrays, error correction can be incorporated in the signal processing of the invention if needed or desired.

Based on the previous discussion relative to use of an $8 \times 8$ dither array for generating cyan, yellow and magenta halftone color separation, it can be recognized that application of the dither array depicted in FIG. 8 requires association of dither threshold values with each small rectangular cell of the depicted dither array. (i.e., each halftone cell must include a set of dither threshold values). The previously discussed constrains also apply. Specifically, threshold values should be assigned so that a growth sequence is established in which the halftone dots in effect grow larger in accordance with the values of the stored continuous tone signals. Also, the growth sequence should result in uniform appearing hardcopy output from a system utilizing the invention when all stored continuous tone signals are of the same value (at various levels of the system grey scale).

Although the general objectives can be achieved by assigning threshold values of 0 to 63 to each group of 64 contiguous small cells that surround the halftone cell center points in FIG. 8, the currently preferred embodiments of the invention utilize a different process that is especially adapted to suit the previously discussed differences between the theoretical dither array described relative to FIG. 7 and the dither array depicted in FIG. 8. In this regard, in the currently preferred embodiments of the invention, the range of continuous tone intensity values is subdivided into a lower range and an upper range. The dither array is then established to exhibit a growth sequence about each halftone cell center point for increasing continuous tone intensity values within the lower range of intensity values. In the dither array that is utilized for the lower range of intensity values, the dither elements that are not a portion of the growth pattern associated with each halftone cell are assigned threshold values that exceed the highest possible continuous tone values. Thus, the associated bit locations of the memory map for the black halftone color separation cannot be set. That means that regions of the resulting black halftone color separation that lie outside the regions associated with the halftone dot growth sequence will always be white (developed in a photographic negative hardcopy) regardless of the value of the associated continuous tone intensity signals.

In the dither array that is utilized with the upper range of intensity values, the situation is in effect reversed. First, the dither elements that contribute to the halftone dot growth sequence for continuous tone intensities within the lower range of intensity values are assigned threshold values that are within the upper range of intensity values. Second, the dither elements that were assigned threshold values that could not result in setting of the corresponding bit in the associated memory map are processed so that those bits always will be set. Because of this and other aspects of the signal processing that are discussed hereinafter, the result basically is that increasing uniform continuous tone intensity values within the lower range of intensity values result in growth of halftone dots that reach a specific size (area) and shape. When the limit of the lower range is reached, increasing uniform continuous tone values (which now are in the upper range) result in halftone dots of a different shape. Specifically, white (or developed) regions that separated the maximum size halftone dots in the halftone color separation for the lower range are now inked (undeveloped) to become the minimum sized halftone dot for color separations in the upper range; a shifting is effected to maintain the halftone dots resulting from the upper range intensity values with the halftone dots of the lower intensity value range; and additional spatial regions are inked (undeveloped) in accordance with the increase in continuous tone intensity value to increase the size of the halftone dots (and, hence, exhibit a higher grey scale level).

Figure 9:
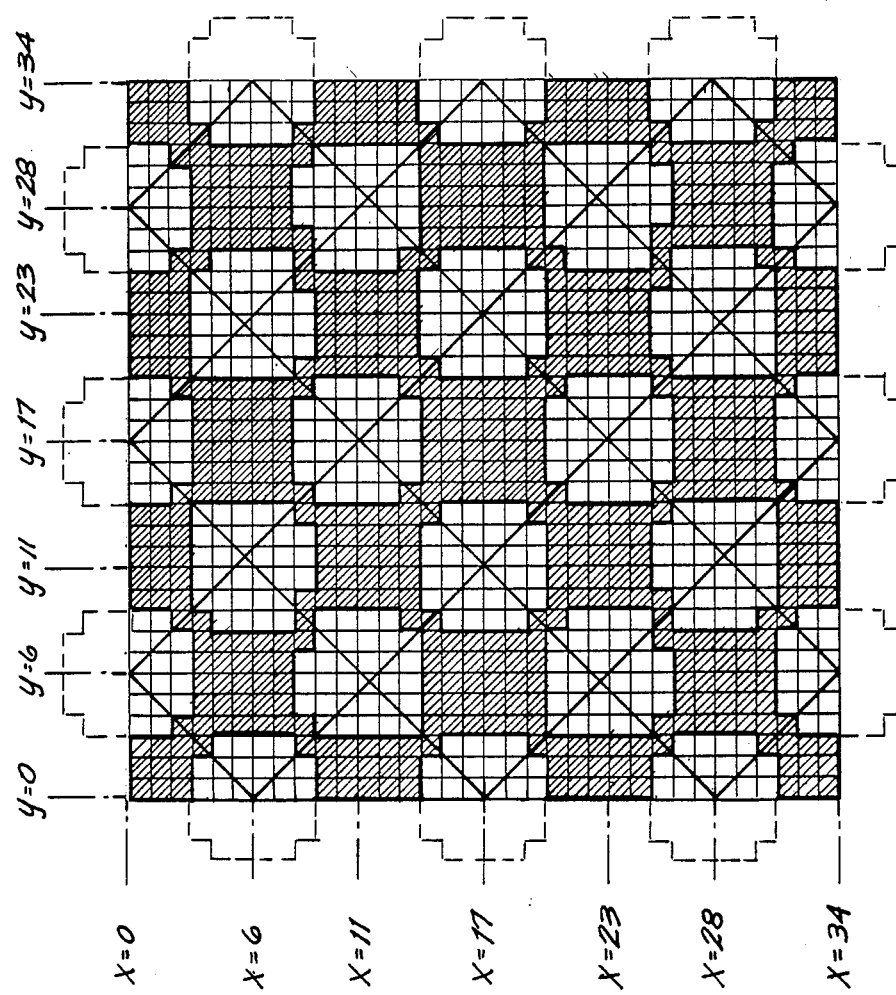
FIG. 9 diagrammatically depicts a modified configuration of the dither array of FIG. 8 which results from the signal processing used in the invention and which is used in processing black halftone continuous tone signals that exceed a predetermined level.

The above discussed aspect of the currently preferred arrangements of the invention can be better understood in view of FIGS. 8 and 9. In the dither array shown in FIG. 8, a group of thirty-two contiguous dither elements that surround each halftone dot center point form a halftone dither cell (shaded in FIG. 8 for purposes of illustration). The thirty-two dither elements (small squares in FIG. 8) are each assigned a threshold level of 0 to 31, inclusive. The dither elements for the unshaded regions that separate the dither cells are assigned one or more threshold values that exceed the highest continuous tone intensity value (e.g., 99 is used in the currently preferred embodiments of the invention in which the maximum continuous tone threshold value is 64). Disregarding temporarily the variation in the depicted halftone cell shapes and the manner in which threshold values are assigned to achieve the desired halftone dot growth sequence, it can be noted that the shaded regions of the dither array of FIG. 8 are equal in area (each consisting of thirty-two dither elements) and the total shaded area is 576 small cells (dither elements). Since the overall area of the dither array is 1,156 cells, it thus can be recognized that the shaded pattern of FIG. 8 is representative of a black halftone color separation for a region of uniform continuous tone intensity value of 32. This being the case, it can be seen that the arrangement meets the basic criteria for halftone dot representation of intensity level 32 (mid-scale grey level in the range of intensity values being processed).

With reference to FIG. 9, it can be seen that the dither array depicted in FIG. 9 bears the following relationship to the dither array of FIG. 8. First, for each shaded halftone dither cell in 58 there is an unshaded region in FIG. 9 that is identical in size and shape. Thus, approximately one-half the total area of the dither array shown in FIG. 9 is shaded and a corresponding halftone screen or color separation meets the basic requirements for representation of mid-scale grey level (continuous tone intensity value of 32). Second, the outline of shaded and unshaded regions in FIG. 9 (the pattern) can be formed from the pattern of FIG. 8 by repeating the pattern for the lefthand one-half of FIG. 8 for y coordinate values ranging between 34 and 51 and translating the origin of the coordinate system to x=0, y=17. The effect of this coordinate shift is to place the centers of the shaded regions (halftone dither cells) of both FIGS. 8 and 9 on the same diagonal lines (i.e., maintain proper screen ruling and screen angle).

Since the dither arrays of FIG. 8 and FIG. 9 both produce mid-scale grey level (when the shaded regions define halftone dots), it can be seen that increasing the size of each halftone dot of either arrangement will result in an increase in grey-scale level. In practicing the invention, the array of FIG. 9 has an advantage, since each of the unshaded regions includes 32 dither cells, which is equal to the number of intensity levels in the range 33–64. Thus, in the currently preferred embodiments, the unshaded regions of the dither array are established as halftone dither cells for continuous tone intensity values within the range of 32–64. In addition, the shaded regions of the dither array of FIG. 9 are assigned threshold values that result in corresponding resolution units of the black color separation being inked (undeveloped in the case of a photographic negative). The continuous tone signals for the black color separation are then processed so that each increasing continuous tone intensity value within the second range of intensity values (33–64, inclusive), will result in one resolution unit of halftone dither cells (unshaded region) of FIG. 9 being inked (or in the case of a photographic negative being undeveloped). Thus, it can be recognized that, in the currently preferred embodiments in the invention, uniform grey scales above the mid-grey scale level (continuous tone intensity values greater than 32) include halftone dots that are shaped differently than those associated with uniform grey scales below the mid-grey scale level. Specifically, one small unshaded square (element of a halftone dither cell) that is contiguous to each shaded area in FIG. 9 becomes set with each increase in level of uniform grey scale to thereby increase the size of each halftone dot in the black color separation. By judiciously assigning dither threshold values to the thirty-two elements of the halftone dither cells, ordered growth of the halftone dots (shrinking of the unshaded areas) is achieved so that all bits of the memory map associated with the black halftone color separation are set for the maximum uniform grey scale (black) and uniform grey scale color separations are obtained at each intensity level.

As shall be described hereinafter, the signal processing of the currently preferred embodiment of the invention does not require both a dither array that is based on the arrangement of FIG. 8 and a dither array that is based on the arrangement of FIG. 9. Instead, the currently preferred embodiments utilize a dither array that corresponds to the above-discussed arrangement of FIG. 8 and process continuous tone intensity values that are greater than 32 in a manner that achieves the desired result without a dither array that corresponds to FIG. 9.

Prior to discussing the sequential processing of stored continuous tone signals representative of the black content of the image being reproduced (i.e., continuous tone signals stored in memory space 18-5 of FIG. 2), attention is directed to the fact that the halftone dither cells of FIG. 8 (and hence the halftone dots associated with a uniform continuous tone intensity value of 32) are equal in size (area), but are not of identical shape. As will become apparent upon understanding the dither threshold values assigned to the dither array of FIG. 8, this variation in shape of the halftone dots for the black halftone color separation of the currently preferred embodiments of the invention also occurs for other grey scale levels (continuous tone intensity values other than 32).

The reason for arranging the dither array in the manner indicated in FIG. 8 is related to the previously discussed considerations used in organizing the dither matrix that is utilized in the practice of the invention to generate cyan, yellow and magenta halftone color separations (e.g., the dither matrix shown in FIG. 4). In particular, achieving proper screen angle and screen ruling will not of itself result in totally satisfactory halftone color separations; the growth sequence of each halftone dot that is produced by the dither array must be established for proper continuous tone intensity values/halftone dot size relationship and, in addition, so that each uniform level of continuous tone intensity produces a halftone screen (color separation) that is uniform in appearance (i.e., produces the desired grey scale without voids, streaks or other discontinuities). In developing the currently preferred embodiments of the invention, it has been found that a dither array arrangement of the type shown in FIG. 8 which utilizes the threshold values discussed hereinafter relative to FIGS. 10A and 10B achieves the desired result.

Several general considerations that are important to establishing a dither array for producing black halftone color separations in accordance with the invention can be noted in FIG. 8. First, it can be seen that the halftone dither cells of FIG. 8 (and hence the halftone dots produced for uniform continuous tone intensity level of 32) exhibit four quadrant symmetry about the lines x=17, y=17 (i.e., there is symmetry about the center of the depicted 34×34 dither array. Since the dither array in effect is repeated by using modulo based 34 operation in processing stored continuous tone signals that are representative of the black color content of the image being reproduced, a halftone screen produced with the arrangement of FIG. 8 will exhibit a highly uniform and symmetric distribution of halftone dots. Further, although not necessary, it has been found advantageous to organize the black halftone dither array in the manner indicated in FIG. 8 so that approximately one-half of the dither array elements are included in the halftone dither cells, i.e., have threshold values that are within the range of continuous tone intensity values. More specifically, with particular reference to the arrangement of FIG. 8 and the currently preferred embodiment of the invention, threshold values that are less than 32. In addition, although not necessary, it has been found that satisfactory results may best be achieved when the halftone dots produced at the mid-grey scale level (continuous tone intensity value 32 with respect to the arrangement of FIG. 8) are not contiguous, but are separated by interstitial regions of white or developed regions in a photographic negative hardcopy output. With reference to FIG. 8, this aspect is present since the halftone dither cells are isolated from one another.

Figure 10A:
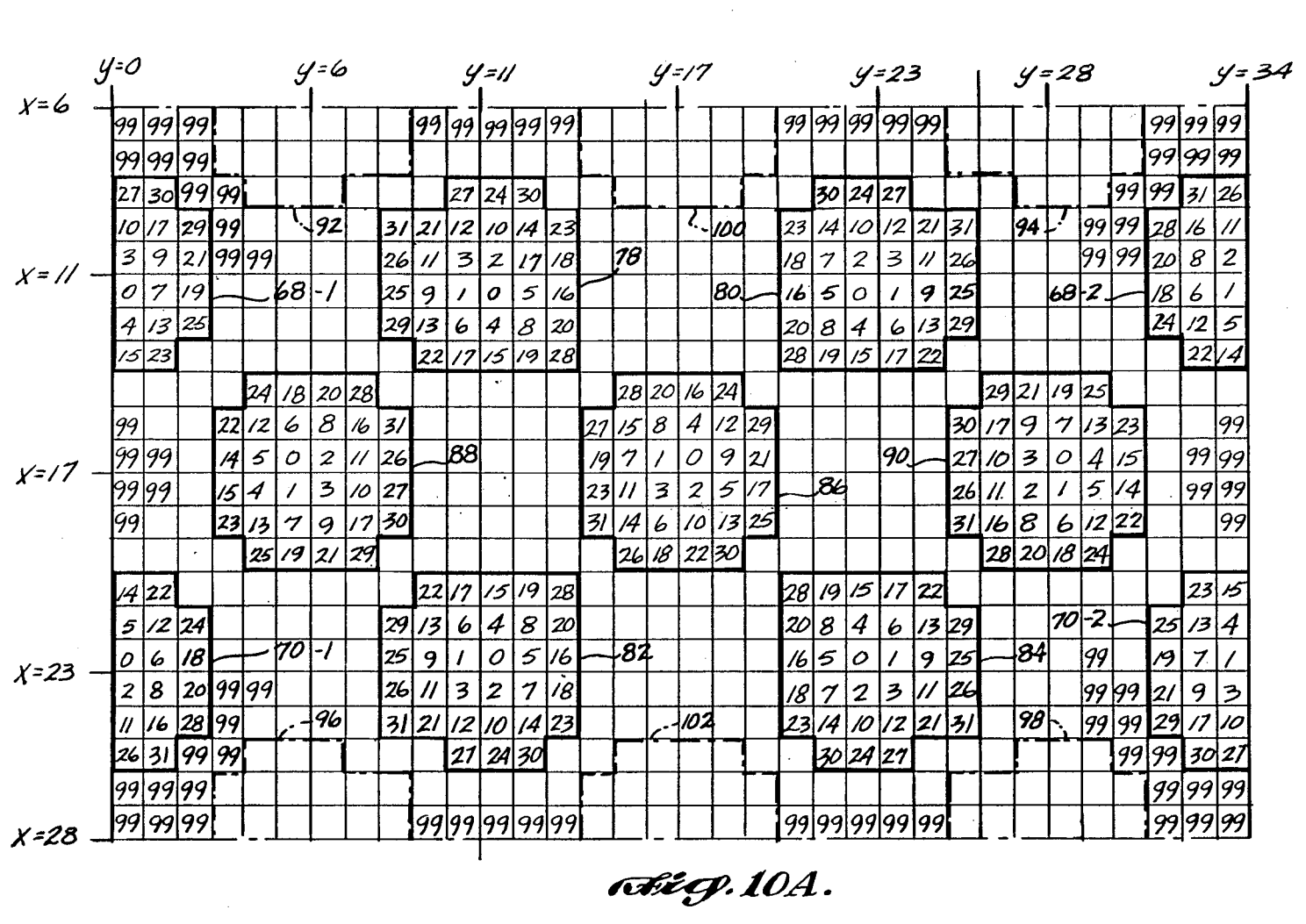
Figure 10B:
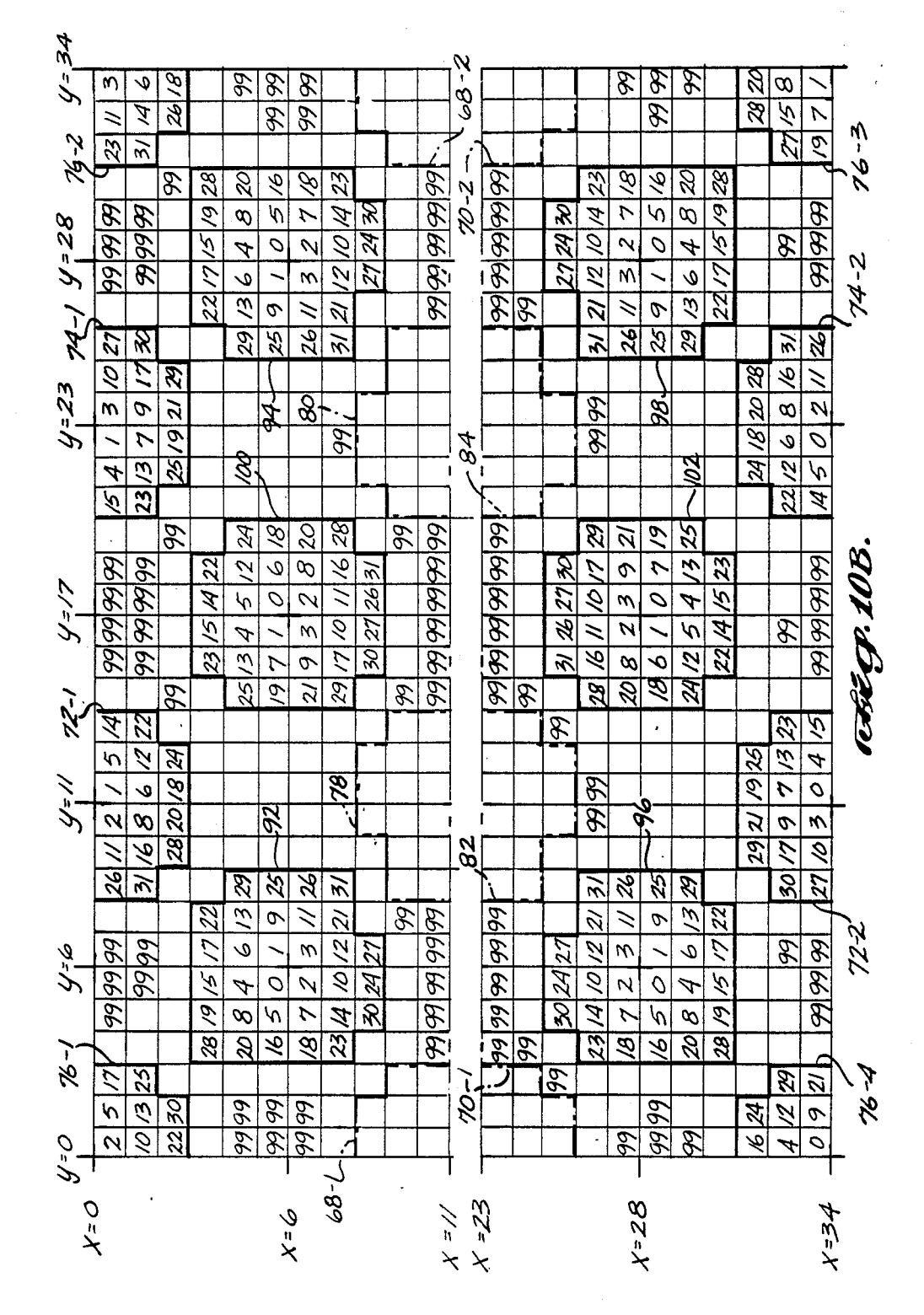

FIGS. 10A and 10B each depict portions of the dither array that is arranged in accordance with the array of FIG. 8 and is utilized in generating the black halftone color separation in the currently preferred embodiments of the invention. Specifically, FIG. 10A illustrates the portion of the dither array of FIG. 8 that is associated with halftone dither cells having center points that lie on coordinate lines x=11, x=17 and x=23. FIG. 10B illustrates the upper and lower regions of the dither array of FIG. 8, including halftone dither cells having center points on the coordinate line x=6 and x=28 and halftone dither cell half and quarter sections lying along the coordinate lines x=0 and x=34.

With collective reference to FIGS. 10A and 10B, it can be noted that threshold values of 99 are assigned to each dither element outside the halftone cells and threshold values are assigned within each halftone dither cell so that each cell includes the sequence 0,1,2, ...,31. Thus, the halftone dither cells each include 32 threshold values, and are suitable for processing the lower half of the range of 64 continuous tone intensity values that is used in the currently preferred embodiments of the invention. Further, it can be noted that the threshold values are organized so that the depicted halftone dither cells will result in halftone dot growth sequence about the halftone dither cell center points for various increasing uniform levels of continuous tone intensity. Moreover, it can be seen from FIGS. 10A and 10B that the halftone dither cell half sections and quarter sections (quarter sections 62 and half sections 64 in FIG. 7) collectively define halftone dither cells that include 32 elements with the threshold values ranging between 0 and 31. That is, with respect to FIG. 10A, the pair of half section halftone dither cells 68-1 and 68-2 and the pair of half section halftone dither cells 70-1 and 70-2 both form complete halftone cells in which the threshold levels range from 0 to 31 when, in accordance with the invention, the depicted pattern is in effect repeated by use of modulo 34 signal processing relative to the horizontal direction (y coordinate direction). With respect to FIG. 10B, the pair of half section halftone dither cells 72-1 and 72-1 and the pair of half section halftone dither cells 74-1 and 74-2 form complete halftone cells having elements ranging form 0 to 31 when the dither array in effect is repeated by using modulo 34 signal processing relative to the vertical direction (x coordinate direction). Still referring to FIG. 10B, it can be noted that modulo 34 operation which respect to both the x and y coordinate direction will form depicted quarter sections 76-1, 76-2, 76-3 and 76-4 into a single halftone dither cell in which the threshold values range between 0 and 31.

Referring specifically to the halftone dither cells depicted in FIG. 10A, it can be seen that halftone dither cell 78 (center point at x=11, y=11) and halftone dither cell 80 (center point at x=11, y=23) not only exhibit symmetry of shape relative to center coordinate y=17, but also include symmetry about this center line with respect to the arrangement of the threshold values within the halftone dither cells. That is, any particular dither threshold d=i; i=0,1,2, ...,31 in halftone dither cells 78 and 80 is positioned in the same row (same x coordinate) and is equidistant from the center line y=17. This also is true of halftone dither cell 82 (center point at x=23, y=11) and halftone dither cell 84 (center point at x=23, y=23). Moreover, the arrangement of threshold values within halftone dither cell 78 and halftone dither cell 82 exhibits this same symmetrical organization relative to one another and to dither array center line x=17. This also is true of the organization of halftone dither cells 80 and 84. The consequence of the above described organization of halftone dither cells 78, 80, 82 and 84 is that each group of consecutive threshold levels for these halftone dither cells (and hence each halftone dot produced by these halftone dither cells) will be of the same shape and symmetry will be exhibited about the dither array center point x=17, y=17.

With collective reference to FIGS. 10A and 10B, it can be noted that the threshold levels in halftone dither cell 86 (which is located at the center of the dither array; center point at x=17, y=17, FIG. 10A) are organized identically to the threshold level organization that results when quarter section halftone dither cells 76-1, 76-2, 76-3 and 76-4 form a single halftone dither cell (which results due to modulo 34 operation of the currently preferred embodiment of the invention). This means that halftone dots identical in size, shape and orientation will result from halftone dither cell 86 and the halftone dither cell formed by quarter sections 76-1, 76-2, 76-3 and 76-4 with the halftone dots appearing in the black halftone color separation so that the center points thereof are positioned at the four corners and the center of square regions of the color separation that include 34 rows and 34 columns of output device resolution units. With specific reference to FIG. 10A, it also can be noted that halftone dither cell 88 (center point at x=17, y=6) and halftone dither cell 90 (center point at x=17, y=28) are identical in shape, but do not exhibit threshold level organization that is symmetric about center line y=17. However, the threshold level organization used in halftone dither cells 88 and 90 is related.

Specifically, it can be seen that, except for threshold levels 0 and 1, the threshold level organization of halftone dither cell 90 is identical to the organization of halftone dither cell 88 when one of the halftone dither cells 88 and 90 is rotated 180°.

The relationship between halftone dither cells 88 and 90 also is exhibited between the halftone dither cell formed by halftone dither cell half sections 68-1 and 68-2 and the halftone dither cell formed by halftone dither cell half sections 70-1 and 70-2. Specifically, the halftone dither cell formed by half sections 70-1 and 70-2 has a threshold level organization which is identical to that of the halftone dither cell formed by half sections 68-1 and 68-2 when one of the halftone dither cells is rotated by 180° (except for organization of the 0 and 1 threshold levels). Also, as can be seen in FIG. 10A, the halftone dither cell threshold level organization of the halftone dither cell formed by half sections 68-1 and 68-2 is identical to the threshold level organization of halftone dither cell 90, except that the halftone dither cell formed by half sections 68-1 and 68-2 is rotated 90° clockwise. Further, the threshold level organization of the halftone dither cell half sections 70-1 and 70-2 is identical to that of halftone dither cell 88, except for a 90° counterclockwise rotation of the halftone dither cell formed by half sections 70-1 and 70-2 relative to the orientation of halftone dither cell 90.

The effect of the above-discussed relationship is that halftone dither cells 88 and 90 and the two halftone dither cells formed by halftone cell half sections 68-1, 68-2, 70-1 and 70-2 result in groups of halftone dots which are identical in shape at each system grey scale level, with each such group of halftone dots consisting of four halftone dots having center points that are located at the vertices of a square whose diagonal dimension is 12 resolution units of the system output device. Stated otherwise, these halftone dither cells in effect result in diamond-shaped patterns of identically shaped halftone dots in which the center point of each halftone dot is at a vertice of the diamond-shaped pattern and, at grey scale levels at which the halftone dots are not symmetric, halftone dots that are located at oppositely disposed corners of the patterns are rotated 180° relative to one another.

With reference to FIG. 10B, it can be seen that similar relationships exist relative to the halftone dither cells included in the upper and lower portions of the dither array that is used with the currently preferred embodiments of the invention. First, it can be seen that halftone dither cell 92 (center point at x=6, y=11), halftone dither cell 94 (center point at x=6, y=28), halftone dither cell 96 (center point at x=28, y=6), and halftone dither cell 98 (center point at x=28, y=28) exhibit symmetry about the dither array center x=17, y=17 of the type described relative to halftone dither cells 78, 80, 82 and 84 of FIG. 10A. Thus, the organization of threshold levels within halftone dither cells 92, 94, 96 and 98 will result in halftone dots of the same shape and symmetry will be exhibited about the dither array center point x=17, y=17 for each system grey scale that is associated with threshold levels 0–31. It also can be seen from FIGS. 10A and 10B that: halftone dither cell 78 is identical to halftone dither cell 98; halftone dither cell 80 is identical to halftone dither cell 96; halftone dither cell 82 is identical to halftone dither cell 94; and, halftone dither cell 84 is identical to halftone dither cell 92. Thus, except for spacing and relative orientation of the halftone dots, the pattern of halftone dots produced by halftone dither cells 78, 80, 82 and 84 is identical to the pattern of halftone dots produced by halftone dither cells 92, 94, 96 and 98 (at any grey scale level associated with dither thresholds in the range 0–31.

With reference to FIG. 10B, it can be seen that halftone dither cell 100 (center point at x=6, y=17) and halftone dither cell 102 (center point at x=28, y=17) have threshold level organizations that are similar to the relative threshold organizations of halftone dither cells 88 and 90 in FIG. 10A. That is, except for thresholds of 0 and 1, the threshold level organization of halftone dither cell 102 can be obtained by rotating halftone dither cell 100 through an angle of 180°. Thus, the halftone dots produced by halftone dither cells 100 and 102 relative to increasing threshold level are identical in shape and are rotated relative to one another by 180°.

It also can be seen in FIG. 10B that the threshold level organization of a halftone dither cell that is formed by halftone dither cell half sections 72-1 and 72-2 is identical to the organization of threshold levels within halftone dither cell 102, when the halftone dither cell formed by half sections 72-1 and 72-2 is rotated counterclockwise 90°. Further, the threshold level organization of the halftone dither cell formed by halftone dither cell half sections 74-1 and 74-2 is identical to the threshold level organization of halftone dither cell 100, when the halftone cell formed by half sections 74-1 and 74-2 is rotated 90° counterclockwise. This means that the halftone dither cells formed by half sections 72-1 and 72-2 and by 74-1 and 74-2 exhibit the previously discussed relationship in which the threshold levels, except for threshold levels 0 and 1, are organized in an identical manner with the halftone dither cells that are formed by the half sections being rotated 180° relative to one another. The result is identical to that previously described relative with respect to halftone dither cells 88 and 90 and the two halftone dither cells formed by halftone dither cell half sections 68-1, 68-2, 70-1 and 70-2 (FIG. 10A). Specifically, for each grey scale level that is produced for dither threshold levels in the range 0–31, a group of four halftone dots results with the center points of the halftone dots being located at the vertices of a square whose diagonal dimension is 12 resolution units of the system output device. As was previously described, that grey scale level at which the halftone dots are not symmetric, halftone dots that are located at oppositely disposed vertices are rotated 180° relative to one another.

Figure 11:
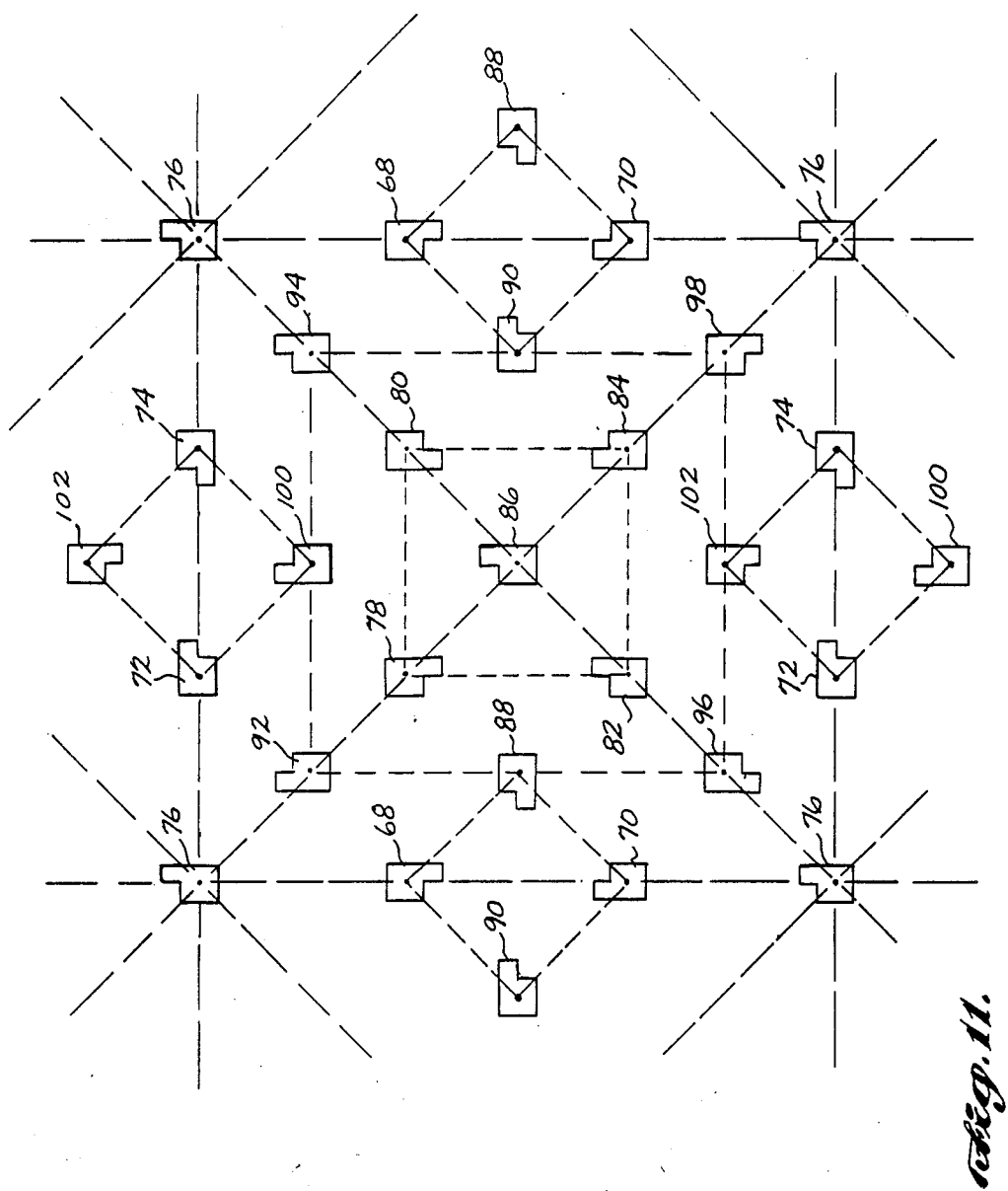
FIG. 11 indicates an exemplary pattern of halftone dots that results from the dither array shown in FIGS. 8-10 for a particular uniform value of continuous tone intensity.

FIG. 11 is a representation of a portion of a black halftone color separation that results from the above-discussed 34×34 dither array for uniform continuous toned intensity values of 5. In FIG. 11, representations of the resulting halftone dots are identified by the same numerals used in FIGS. 10A and 10B to identify halftone cells, half sections of halftone cells and quarter sections of halftone cells. The broken lines in FIG. 11 illustrate the previously discussed halftone dot configuration and orientation relative to the various groups of halftone cells. As can be seen from FIG. 11, the depicted halftone dots are positioned to achieve the previously discussed screen ruling and the required 45° screen angle with the dots being identical in shape. Moreover, in viewing FIG. 11 it can be noted that the various previously discussed geometrically oriented groups of halftone dots will form geometric patterns throughout the entire halftone screen. The combined effect of the above-discussed attributes is that a halftone screen of the configuration indicated in FIG. 11 will appear to be a uniform shade of grey (grey level 5 in the 64 grey levels of the currently preferred embodiment of the invention) when the system output device has relatively low output resolution. In this regard, currently available laser printers having resolution on the order of 300 resolution units per inch provide a more than satisfactory result. Since halftone dots produced at each grey scale level will exhibit the same spacing and geometric relationship, the 34×34 dither array of the currently preferred embodiments produces uniform appearing halftone color separations at each system grey scale level.

It should be noted that the above-discussed dither array (and organization of threshold levels within the halftone cells) can vary from that depicted in FIGS. 8, 10A, 10B and 11 while still obtaining satisfactory results. As previously mentioned, the primary considerations are the selection of a lower range of threshold values; the organization of halftone cells that include each dither threshold value within the selected range; and organizing the dither threshold values within the halftone cells so that suitable growth sequences are obtained and each grey scale black halftone color separation produced by the halftone cells in uniform in appearance. Thus, in practice, the general constraints and considerations discussed herein are applied and it may be necessary to modify the shape of the halftone cells and/or the organization of threshold levels within the halftone cells to obtain the desired degree of uniform appearance for each associated grey scale black halftone color separation. The threshold level organizational characteristics and the halftone cell shape and orientation considerations discussed relative to FIGS. 10A, 10B and 11 often can be incorporated in the practice of the invention to produce the desired results, even in situations in which the black halftone dither array is of a dimension other than 34×34.

As was discussed relative to FIGS. 8 and 9, in accordance with the invention, the black halftone dither array in effect is modified during processing of continuous tone intensity values that are within the upper range of intensity values (33–64 in the disclosed embodiment). As was discussed relative to FIG. 9, the modification results in a m×m dither array (34×34 in the disclosed embodiment) in which regions of the original dither array that could not be set by any continuous tone intensity value in the lower range of continuous tone intensity values (i.e., regions outside the halftone dither cells) will be set for any continuous tone intensity value in the upper range. In addition, the modification results in setting one additional bit of the black halftone memory map, e.g., memory space 18-10 in FIG. 2) for each incremental increase in continuous tone intensity level (each incremental increase in grey scale). Further, the signal processing that in effect modifies the dither array which is used with the lower range of continuous tone intensity values also shifts the dither array relative to the x coordinate axis of FIGS. 8, 10A and 10B so as to align halftone dots produced with the modified signal processing (upper range of continuous tone intensity values) with halftone dots produced by the dither array utilized for continuous tone intensity values within the lower range of continuous tone intensity values.

The signal processing used in the currently preferred embodiment of the invention to simultaneously process both ranges of continuous tone intensity values can be understood by considering the processing of an ordered array of continuous tone intensity values $c_{ij} = v_{ij}$, where $i = 1, 2, 3, \ldots, i_m$; $j = 1, 2, 3, \ldots, j_m$; $v_{ij}$ is a continuous tone intensity value within the range of 1–64; and where, the row and column indices $i_m$ and $j_m$ respectively represent the maximum values of i and j (determined by the length and width of the image being reproduced). With this arrangement, which corresponds to the arrangement discussed relative to memory space 18-10 of FIG. 2, the signal processing utilized in the invention includes the following steps and substeps.

(1) Sequentially accessing each row i of continuous tone intensity values (2) For each accessed row, processing on a one by one basis each continuous tone intensity value $c_{ij}$. Such processing including the steps of:
  (a) determining whether the continuous tone intensity value $c_{ij}$ is in the range of 1–32 or is in the range of 32–64;
  (b) if $c_{ij}$ is in the range 1–32, dividing both the row index i and the column index j by 34 (performing modulo 34 operation relative to both the row and column numbers) to determine the row and column number of a corresponding dither threshold value in the 34×34 dither array of the currently preferred embodiment of the invention;
  (c) if the continuous tone intensity value being processed $c_{ij}$ is in the range of 33–64, dividing x and (j+17) by 34 (performing modulo 34 operation relative to the row index and a column index that is shifted by an amount equal to one/half the dimension of the dither array) to determine the row and column number of an associated dither threshold in the system 34×34 dither array;
  (d) if $c_{ij}$ is in the range 1–32, comparing the continuous tone intensity value $c_{ij}$ with the associated dither threshold value and setting a corresponding bit $b_{ij}$ in an ordered memory array, when the continuous tone intensity value $c_{ij}$ is greater than the associated dither threshold value;
  (e) if the continuous tone intensity value $c_{ij}$ is in the range 33–64, determining the value of the quantity $(64 - c_{ij})$; comparing the value with the dither threshold level obtained in step (c); and setting a corresponding bit $b_{ij}$ of the ordered memory array when the quantity $64 - c_{ij}$ is less than or equal to the dither threshold level.

In the above signal processing of continuous tone intensity values that are in the range 33–64, subtracting the continuous tone intensity value $c_{ij}$ from 64 converts the continuous tone intensity value to a value will result in the previously discussed incremental increase in each halftone dot that is generated for grey scale levels 33–64.

Figure 12:
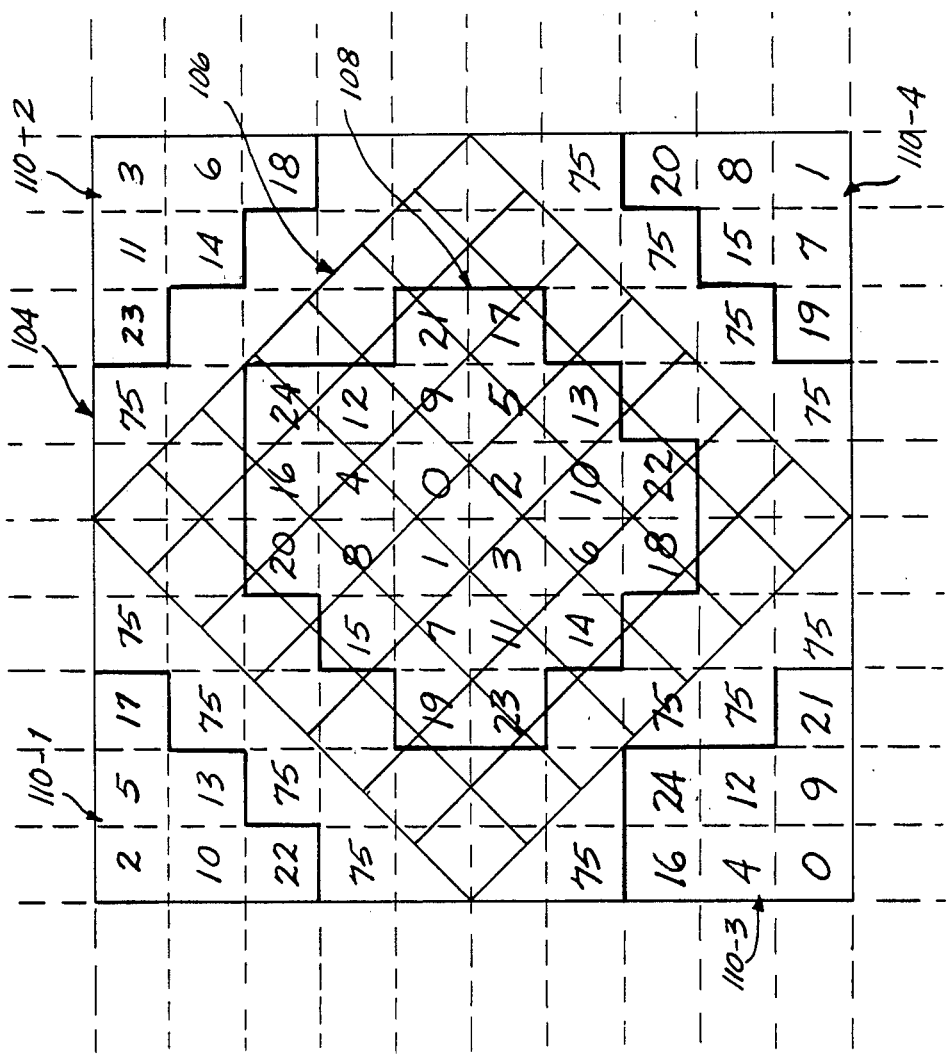
FIG. 12 depicts a dither array halftone cell arrangement useful in understanding more generalized application of the halftone arrangement discussed relative to FIGS. 8-11 and in understanding compensation or error correction that can be employed in the practice of the invention, if necessary or desired.

Although discussed in terms of an arrangement that utilizes an 8×8 dither matrix for signal processing that results in the cyan, yellow and magenta halftone color separations and a 34×34 dither array that is used in the signal processing that results in the black halftone color separation, it should be recognized that the invention is not limited to any particular range of continuous tone intensity values, dither matrix dimensions, or dither array dimensions. For example, FIG. 12 depicts a 10×10 dither array 104 which surrounds a 7×7 halftone dither matrix 106 with the boundary edges of the dither matrix 106 being at 45° angles with the boundary edges of dither array 104. Thus, dither array 104 can be employed in an embodiment of the invention that utilizes a 7×7 dither matrix to generate cyan, yellow and magenta halftone screens of a desired screen ruling.

Shown within the interior region of the outlined dither matrix 106 is a halftone dither cell 108 that includes threshold levels within the range 0–24, with the center point of halftone dither cell 108 coinciding with the center point of the dither array 104. Located at the corners of dither array 110 are halftone dither cell quarter sections 110-1, 110-2, 110-3, and 110-4. As can be seen from FIG. 12, when dither array 104 is repeated (by modulo 10 processing), the halftone dither cell quarter sections will form halftone dither cells having an outline identical to that of halftone dither cell 108.

For purposes of illustration, halftone dither cell 108 and the quarter section halftone dither cells include dither threshold values within the range 0–24, with the threshold level organization being identical to the corresponding region of halftone dither cell 86 of FIG. 10A. Each element of dither array 104 that is not included within halftone dither cell 108 or one of the halftone cell quarter sections is assigned a threshold level of 75. As was discussed relative to the 34×34 dither array of the currently preferred embodiments of the invention, improvement in the uniformity of each grey scale halftone color separation that results from the depicted arrangement by slightly altering the shape of halftone dither cell 108 (with corresponding altering of the shapes of halftone dither cell quarter sections 110-1, 110-2, 110-3, and 110-4) and/or by changing the organization or threshold levels within halftone dither cell 108 and the halftone dither cell quarter sections. In this regard, empirical testing can be employed and, to the degree applicable, the geometric considerations discussed relative to the 34×34 dither array of the currently preferred embodiment of the invention can be considered.

Regardless of the exact halftone cell configuration and organization of threshold levels within the halftone dither cell, it can be noted that the arrangement depicted in FIG. 12 can be used in the same manner as the 34×34 dither array of the currently preferred embodiments of the invention. In this regard, the signal processing would be based on modulo 10 operation instead of modulo 34 operation; the lower range of continuous tone intensity values would be 1–25; and the upper range of continuous tone intensity values would be 26–49.

Like the 34×34 dither array of the currently preferred embodiment of the invention, the dither array of FIG. 12 is an approximation. Specifically, the ideal dither array in a system that utilizes a 7×7 dither matrix for the yellow, cyan and magenta halftone color separations would have boundary edges equal to $7\sqrt{2}$ (approximately 9.8995 units). Thus, use of the depicted 10×10 dither array results in an error that slightly exceeds one unit (and hence one resolution unit of the system digital output device) each time 100 continuous tone elements are processed (rows of continuous toned elements or column elements within a row of elements). Thus, the error encountered with use of the dither array shown in FIG. 12 is greater than the error encountered with the currently preferred 34×34 dither array of the currently preferred embodiments of the invention. To at least partially counteract the effect of this error, compensation or error correction can be incorporated in the signal processing. For example, with respect to the arrangement of FIG. 12 dither array 110 may be shifted back one unit after completing the processing of 100 continuous tone values within a row of continuous tone values or 100 rows of continuous tone values.

It will be recognized by those skilled in the art that various changes and modifications can be made in the embodiments disclosed herein without departing from the scope and spirit of the invention. For example, in the disclosed embodiment of the invention, an 8×8 dither matrix is used to process cyan, yellow and magenta continuous tone intensity signals that are representative of 64 levels of intensity to thereby provide cyan, yellow and magenta halftone screens that exhibit a screen ruling of r/8, where r represents the output resolution of the digital output device being used in terms of output resolution units per unit length. The same screen ruling can be obtained for continuous tone intensity values that exhibit 256 intensity levels by using a 16×16 dither matrix that corresponds to four contiguous 8×8 dither matrices of the type described in which (0, 4, 8, 12, ..., 250); (1, 5, 9, 13, ..., 253); (2, 6, 10, 14, ..., 254); and (3, 7, 11, 15, ..., 255) are the sets of dither threshold values for the four 8×8 dither matrices, with each 8×8 dither matrix exhibiting substantially the same growth sequence as the 8×8 dither matrix disclosed herein.

The embodiments of the invention in which an exclusive property or privilege is claimed are defined as follows:

1. A digital signal processing method for producing one or more halftone screens that include a plurality of halftone dots that are representative of a photographic image being reproduced and are positioned in accordance with a predetermined screen ruling and a predetermined screen angle, said digital signal processing method comprising the steps of:

storing in memory an ordered array of continuous tone intensity values $c_{ij}$, each continuous tone intensity value $c_{ij}$ being representative of color content within a predetermined spatial region of said photographic image being reproduced with i=1, 2, 3, ..., $i_g$ indicating the coordinate of said predetermined spatial region of said photographic image being reproduced relative to a first axis of a Cartesian coordinate system and j=1, 2, 3, ..., $j_h$ indicating the coordinate of said predetermined spatial region of said photographic image being reproduced relative to the second axis of said Cartesian coordinate system, where $i_g$ and $j_h$ are integers that respectively indicate the dimensions of said photographic image being reproduced, said continuous tone intensity values $c_{ij}$ each being of a value within a predetermined range r:

establishing a dither array of dither threshold values $d_{ij}$ where i=1, 2, 3, ..., p and j=1, 2, 3, ..., q, with p being an integer that is less than said value $i_g$ and with q being an integer that is less than said value $j_h$, said array of dither threshold values $d_{ij}$ forming a pattern of halftone dither cells that at least approximates said predetermined screen ruling and said predetermined screen angle, each said halftone dither cell including a plurality of said dither threshold values $d_{ij}$ with the threshold values included within each said halftone dither cell being no greater than a predetermined value s, where s is within the range r of said continuous tone intensity values and is less than the maximum continuous tone intensity value within said range r, each dither threshold value $d_{ij}$ not included in one of said halftone dither cells being of a value that is not within said range of continuous tone intensity values r;

comparing said continuous tone intensity values $c_{ij}$ with said dither threshold values $d_{ij}$, said comparison including the steps of determining whether each continuous tone intensity value $c_{ij}$ being compared is within said range s of said dither threshold values, identifying for each $c_{ij}$ that is within said range s an associated dither threshold value $d_{ij}$ with modulo p operation being applied relative to the i index of said continuous tone intensity values and modulo q operation being applied to the j index of said continuous tone intensity values, identifying for each $c_{ij}$ outside said range s an associated dither threshold value $d_{(i+k)j}$ where k is a predetermined integer, with modulo p operation being applied relative to the i index of said continuous tone intensity value and modulo q operation being applied relative to the j index of said continuous tone value, and determining whether each said continuous tone value $c_{ij}$ being compared is greater than said associated dither threshold value $d_{ij}$;

storing in memory an array of digitally encoded signals $b_{ij}$ representative of said halftone screen where the indices i and j of said digitally encoded signals correspond to the indices i and j of said continuous tone intensity values that are compared with said associated dither threshold values, each of said digitally encoded signals $b_{ij}$ being representative of the results of said comparison between a continuous tone intensity value $c_{ij}$ and its associated dither threshold value; and supplying said digitally encoded signals to a digital data output device which is responsive to said digitally encoded signals for producing a halftone screen.

2. The digital signal processing method of claim 1 wherein said range r of said continuous tone intensity values includes a predetermined number of intensity values, and wherein said predetermined threshold value s of said dither threshold values is on the order of one half said predetermined number of said continuous tone intensity values in said range r.

3. The digital signal processing method of claim 2 wherein each said dither threshold value not included in said halftone cells is greater than the maximum continuous tone intensity value within said range r of said continuous tone intensity values and wherein said digitally encoded signals $b_{ij}$ are a predetermined value for each continuous tone intensity value $c_{ij}$ that is both within said range s and is less than said associated dither threshold value and are of the same predetermined value for each said continuous tone value that is both outside said range s and is greater than or equal to said associated threshold value.

4. A digital signal processing method for sequentially processing digitally encoded continuous tone intensity values each of which represent the color content within an associated spatial region of an image being reproduced, said method for producing one or more halftone screens in which a digitally encoded continuous tone intensity value is associated with an incremental region of said halftone screen, said method comprising the steps of:

establishing a first m×m dither array, each element of said first dither array being a dither threshold value with said first m×m dither array defining a first pattern of halftone dither cells that are positioned within said first m×m dither array to provide a predetermined screen ruling and a predetermined screen angle when said first m×m dither array is repeated as a larger array that is formed by consecutive repetition of said first m×m dither array, each said halftone cell of said first m×m dither array including a plurality of dither threshold values with the maximum threshold value being no greater than a predetermined continuous tone intensity value that is within the range of continuous tone intensity values that is associated with each halftone screen that is to be produced with said first m×m dither array, each dither threshold value not associated with one of said halftone dither cells of said first m×m dither array being of a value that exceeds every threshold value associated with one of said halftone dither cells;

establishing a second m×m dither array, each element of said second dither array being a dither threshold value with said second dither array defining a second pattern of halftone dither cells that are positioned within said second m×m dither array to provide both a screen ruling and a screen angle that are substantially identical to said predetermined screen ruling and said predetermined screen angle of said first m×m dither array, each said dither cell of said second m×m dither array including a plurality of threshold values with each said threshold value being no greater than the maximum continuous tone intensity value contained in the set of continuous tone intensity values that is associated with each halftone screen that is to be produced with said second m×m dither array, each dither threshold value not associated with one of said halftone dither cells being of a value that is not equal to any threshold value included in one of said halftone dither cells of said second m×m dither array;

comparing each said continuous tone intensity value with said predetermined continuous tone intensity value to determine whether a continuous tone intensity value being processed is less than said predetermined continuous tone intensity value;

for each said continuous tone intensity value that is less than said predetermined continuous tone intensity value, performing the additional steps of
(a) associating said continuous tone intensity value with a dither threshold value of said first m×m dither array;
(b) comparing said continuous tone intensity value with said associated dither threshold value of said first m×m dither array; and
(c) based on said comparison, generating a binary value representative of whether said incremental region of said halftone screen that is associated with said continuous tone intensity value is to be produced as a substantially blackened region of said halftone screen; and for each said continuous tone intensity value that is not less than said predetermined continuous tone intensity value, performing the additional steps of
(a) associating said continuous tone intensity value with a dither threshold value of said second m×m dither array;
(b) comparing said continuous tone intensity value with said associated dither threshold value of said second m×m dither array; and
(c) based on said comparison, generating a binary value representative of whether said incremental region of said halftone screen that is associated with said continuous tone intensity value is to be produced as a substantially blackened region of said halftone screen.

5. The digital signal processing method of claim 4 wherein the decimal equivalent of each said digitally encoded continuous tone intensity value being processed corresponds to an integer within a set of integers that consists of zero and k non zero integers, where k is a positive integer, and wherein each said halftone cell of said first and second m×m dither arrays include a number of dither threshold values that is substantially equal to k/2.

6. The digital signal processing method of claim 5 wherein each of said halftone cells of said second m×m dither array substantially correspond in size and shape to at least one region of said first m×m dither array that is not included in said halftone cells of said first m×m dither array.

7. The digital signal processing method of claim 5 wherein an array of memory bit locations is established in memory for each of said halftone screens being produced, each memory bit location of said array being associated with one of said continuous tone intensity values and an incremental spatial region of an associated halftone screen being produced, each of said memory bit locations for storing a first predetermined binary value when said associated region of the associated halftone screen is to be blackened to define a portion of a halftone dot and for storing a second predetermined binary value when said associated region of the associated halftone screen is not to be blackened and does not define a portion of a halftone dot.

8. The digital signal processing method of claim 7 wherein said steps of associating each said continuous tone intensity value with a dither threshold value of said first and second m×m dither arrays includes the step of determining a set of coordinate values for said associated incremental spatial region of said image being reproduced; and wherein said step of associating said continuous tone intensity value with the dither threshold value of said second m×m dither array includes the steps of transforming said set of coordinate values to form a different set of coordinate values and associating said continuous tone intensity value with a dither threshold value of said first m×m dither array on the basis of said different set of coordinate values.

9. The digital signal processing method of claim 8 wherein:
said step of generating a binary value for each said continuous tone intensity value that is less than said predetermined continuous tone intensity value includes setting the memory bit location that is associated with said continuous tone intensity value at said first predetermined binary value when said continuous tone intensity value is greater than said associated dither threshold value of said first m×m dither array;
said step of comparing said continuous tone intensity value with said associated dither threshold value of said second m×m dither array includes the step of subtracting said continuous tone intensity value from a value representative of the maximum continuous tone intensity value included in said range of continuous tone intensity values to obtain a modified continuous tone intensity value and comparing said modified continuous tone intensity value with said associated dither threshold value; and
said step of generating said binary value for each continuous tone intensity value that is not less than said predetermined continuous tone intensity value includes the step of setting the memory bit location associated with said continuous tone intensity value at said first predetermined binary value when said modified continuous tone intensity value does not exceed said associated dither threshold value.

10. The digital signal processing method of claim 4, wherein two or more halftone screens are to be produced, each of said two or more halftone screens having substantially identical screen ruling and having different screen angles, said digital processing method producing at least one of said two or more halftone screens with said first and second m×m dither arrays and producing at least one of said halftone screens by the steps of:
establishing a n×n dither matrix for producing each halftone dot of each halftone screen to be produced with said n×n dither matrix, each element of said n×n dither matrix being a dither threshold value that is within the range of the set of continuous tone intensity values for each halftone screen to be produced with said n×n dither matrix, said dither threshold values being organized as elements of said dither matrix to establish a growth sequence in which the lowest dither threshold values are located nearest the center of said dither matrix and the highest dither threshold values are located at and near the boundary regions of said dither matrix;
associating each said continuous tone intensity value of a halftone screen to be produced by said n×n dither matrix with a dither threshold value of said n×n dither matrix;
comparing said continuous tone intensity value with said associated dither threshold value of said n×n dither matrix; and
based on said comparison, generating a binary value representative of whether said incremental region of said halftone screen that is associated with said continuous tone intensity value is to be produced as a substantially blackened region of said halftone screen.

11. The digital signal processing method of claim 10, wherein:
the decimal equivalent of said digitally encoded continuous tone intensity value for producing halftone screens with said first and second m×m dither arrays and with said n×n dither matrix each corresponding to an integer within a set of integers that ranges from zero to $n^2$;
each dither threshold value of each said halftone cell of said first m×m dither array corresponds to a different integer of said set of integers; and
each dither threshold value of said n×n dither matrix corresponds to a different integer of said set of integers.

12. The digital signal processing method of claim 11 wherein each said dither threshold value of each said halftone cell of said first m×m dither array does not exceed $n^2/2$ and each said dither threshold value not associated with one of said halftone dither cells of said first m×m dither array is not less than $n^2$.

13. The digital signal processing method of claim 12 wherein the dimension m of said first and second m×m dither arrays is substantially equal to $np\sqrt{2}$, where p is a nonzero positive integer.

14. The digital signal processing method of claim 13 wherein said m×m dither array is shifted when a predetermined number of said continuous tone intensity values have been processed, said shift associating subsequently processed continuous tone intensity values with a different dither threshold value of said m×m matrix than would occur without said shift to compensate for the fractional difference between dimension m of said first and second dither arrays and the quantity $np\sqrt{2}$.

15. The digital signal processing method of claim 13 further comprising the steps of:
  initially storing said sets of continuous tone intensity values in memory, with each said continuous tone intensity value that is associated with an incremental region of a halftone screen being stored at a memory address that is indicative of the location of said associated incremental region within said halftone screen;
  storing dither threshold values of at least said first m×m dither array and said n×n dither matrix in memory at addresses that provide a substantially one-to-one correspondence between said stored continuous tone intensity values and said stored dither threshold values;
  said steps of associating a continuous tone intensity value with a dither threshold value of said first m×m dither array and associating a continuous tone intensity value with a dither threshold value of said n×n dither matrix each including the steps of recalling from memory the continuous tone intensity value being processed and accessing the corresponding dither threshold value on the basis of said memory address of said continuous tone intensity value being processed.

16. The digital signal processing method of claim 15 for producing at least three halftone screens wherein the difference between the screen angles of three of said halftone screens is substantially equal to thirty degrees and wherein one of said halftone screens is produced with said first and second m×m dither array and at least two of said halftone screens are produced with said n×n dither matrix.

17. The digital signal processing method of claim 16 wherein said step of associating a continuous tone intensity value with a dither threshold value for at least one of said halftone screens produced with said n×n dither matrix further includes the steps of:
  determining a transformed memory address for each recalled continuous tone intensity value;
  associating each recalled continuous tone intensity value with a dither threshold value of said n×n dither matrix in accordance with said transformed memory address.

18. The digital signal processing method of claim 17 for producing cyan, yellow, magenta and black halftone screens for conventional four color halftone printing of photographic images wherein:
  a set of continuous tone intensity values representative of the yellow content of the photographic image being reproduced is processed with said n×n dither matrix without utilizing said step of determining a transformed memory address for each recalled continuous tone intensity value;
  a set of continuous tone intensity values representative of the cyan color content of the photographic image being reproduced is processed with said n×n dither matrix if said step of determining a transformed memory address for each recalled continuous tone intensity value being performed to provide a screen angle that differs from the screen angle of said yellow halftone screen by substantially 15 degrees;
  a set of continuous tone intensity values representative of the magenta content of the photographic image being reproduced is processed with said n×n dither matrix with said step of determining a transformed memory address for each recalled continuous tone intensity value being performed to provide a screen angle that differs from said screen angle of said yellow halftone screen by substantially 15 degrees and differs from said screen angle of said cyan halftone screen by substantially 30 degrees; and
  a set of continuous tone intensity values representative of the black content of said photographic image is processed with said first and second m×m dither arrays to provide a screen angle that results in a substantially 30 degree difference between the screen angles of said black, cyan and magenta halftone screens.

19. The digital signal processing method of claim 18 wherein the steps of determining a transformed memory address for each recalled continuous tone intensity value representative of the cyan and magenta color content of the photographic image being reproduced comprises rotating the memory address of the stored continuous tone intensity values in Cartesian coordinate space by an angle that is substantially equal to 15 degrees and rounding the coordinates of the rotated memory addresses to the nearest integer values.

20. The digital signal processing method of claim 19 wherein the step of determining transformed memory addresses for continuous tone intensity values representing the cyan and magenta color content of the photographic image being reproduced comprises rotating in Cartesian coordinate space two or more memory addresses for each set of continuous tone intensity values that represent the cyan and magenta color content of the image being reproduced; determining incremental values for consecutive memory addresses relative to columns of memory addresses and rows of memory addresses; and determining the transformed memory addresses by incrementing the memory address of the continuous tone intensity value last processed by said incremental values.

21. A digital signal processing method for processing a plurality of sets of digitally encoded continuous tone intensity values to produce a corresponding number of halftone color separations in which a plurality of halftone dots are arrayed at a substantially identical screen ruling with each halftone color separation exhibiting a different predetermined screen angle, each set of digitally encoded continuous tone intensity values being representative of a particular component color content of an image that is to be reproduced with the halftone color separations, each continuous tone intensity value being representative of the color content within an associated spatial region of the image being reproduced and being associated with an incremental region of a halftone screen, said method comprising the steps of:
  establishing a n×n dither matrix for producing the halftone dots of at least one of said halftone color separations, each element of said n×n dither matrix being a dither threshold value that is within the range of the set of continuous tone intensity values for the halftone screen being produced, said dither threshold values being organized as elements of said n×n dither matrix to establish a growth sequence in which the lowest dither threshold values are located nearest the center of said dither matrix and the highest dither threshold values are located at or near the boundary regions of said dither matrix;

establishing at least one m×m dither array for producing the halftone dots of at least one of the remaining halftone color separations, the dimension m of each said m×m dither array being substantially equal to $pn\sqrt{2}$, where p is a nonzero positive integer, each element of each m×m dither array being a dither threshold value with each m×m dither array defining a pattern of halftone dither cells that are positioned within the dither array to provide said predetermined screen ruling and a predetermined screen angle;

processing each continuous tone intensity value of at least one set of said continuous tone intensity values with said n×n dither matrix by
  (a) associating each said continuous tone intensity value with a dither threshold value of said n×n dither array;
  (b) comparing each said continuous tone intensity value with said associated dither threshold value of said n×n dither matrix; and
  (c) based on said comparison, generating a binary value representative of whether said incremental region of the halftone color separation that is associated with the set of continuous tone intensity values being processed is to be produced as a substantially blackened region of said halftone color separation; and processing each continuous tone intensity value of at least one of the remaining sets of said continuous tone intensity values with at least one of said m×m dither arrays by
  (a) associating each said continuous tone intensity value with a dither threshold value of said m×m dither array;
  (b) comparing each said continuous tone intensity value with said associated dither threshold value of said m×m dither array; and
  (c) based on said comparison, generating a binary value representative of whether said incremental region of the halftone color separation that is associated with a set of continuous tone intensity values being processed is to be produced as a substantially blackened region of said halftone color separation.

22. The digital signal processing method of claim 21 wherein a single set of said continuous tone intensity values is processed with said at least one m×m dither array to produce a color separation that exhibits a screen angle substantially equal to 45° relative to a vertical reference line in said image being reproduced; and wherein two sets of said continuous tone intensity values are processed with said n×n dither matrix to produce two halftone color separations, the first one said two halftone color separations having a screen angle that differs from said 45° screen angle by substantially 30°, the second of said two halftone color separations produced with n×n dither array having a screen angle that differs from said screen angle of said first halftone color separation by substantially 30°.

* * * * *